(12) United States Patent
Ishii et al.

(10) Patent No.: US 7,654,009 B2
(45) Date of Patent: Feb. 2, 2010

(54) ABSOLUTE VALUE SCALE AND ABSOLUTE VALUE CALCULATING METHOD

(75) Inventors: Koh Ishii, Ritto (JP); Katsuyoshi Takeuchi, Ritto (JP)

(73) Assignee: Mitsubishi Heavy Industries, Tokyo (JP)

( * ) Notice: Subject to any disclaimer, the term of this patent is extended or adjusted under 35 U.S.C. 154(b) by 122 days.

(21) Appl. No.: 12/071,596

(22) Filed: Feb. 22, 2008

(65) Prior Publication Data

US 2008/0223942 A1    Sep. 18, 2008

(30) Foreign Application Priority Data

Mar. 7, 2007    (JP) .............................. 2007-056503

(51) Int. Cl.
*G01D 5/245* (2006.01)
(52) U.S. Cl. ...................................... 33/706
(58) Field of Classification Search .................. 33/706
See application file for complete search history.

(56) References Cited

U.S. PATENT DOCUMENTS

| | | | | |
|---|---|---|---|---|
| 4,697,144 A | * | 9/1987 | Howbrook | 324/207.17 |
| 4,764,767 A | * | 8/1988 | Ichikawa et al. | 340/870.31 |
| 5,551,158 A | * | 9/1996 | Tyren et al. | 33/1 N |
| 6,271,661 B2 | * | 8/2001 | Andermo et al. | 324/207.17 |
| 6,928,386 B2 | * | 8/2005 | Hasser | 702/163 |
| 2002/0011838 A1 | * | 1/2002 | Miyata et al. | 324/207.17 |
| 2009/0015248 A1 | * | 1/2009 | Moura et al. | 324/207.26 |
| 2009/0039859 A1 | * | 2/2009 | Shoji | 323/299 |
| 2009/0039874 A1 | * | 2/2009 | Kreit et al. | 324/207.17 |

FOREIGN PATENT DOCUMENTS

| | | |
|---|---|---|
| JP | 06-186053 | 7/1994 |
| JP | 06-241832 | 9/1994 |
| JP | 10-079619 | 3/1998 |
| JP | 11-083545 A | 3/1999 |
| SU | 1429240 A2 | 1/1987 |
| SU | 1511822 A1 | 1/1988 |
| SU | 1784836 A1 | 3/1990 |

* cited by examiner

*Primary Examiner*—Christopher W Fulton
(74) *Attorney, Agent, or Firm*—Birch, Stewart, Kolasch & Birch LLP

(57) ABSTRACT

A rotary absolute value scale includes a rotor in which two rotor side coil patterns provided with different pitches are laminated, and a stator in which two stator side coil patterns provided with different pitches are also laminated. A linear absolute value scale includes a slider in which two slider side coil patterns provided with different pitches are laminated, and a scale in which two scale side coil patterns provided with different pitches are also laminated.

13 Claims, 22 Drawing Sheets

ABSOLUTE VALUE SCALE AND ABSOLUTE VALUE CALCULATING METHOD

BACKGROUND OF THE INVENTION

1. Field of the Invention

The present invention relates to an inductosyn type absolute value scale and an absolute value calculating method.

2. Description of the Related Art

An inductosyn type scale employed in machine tools and the like includes a rotary type (a rotary scale) and a linear type (a linear scale).

The rotary scale is for detecting a rotation angle, and is configured of: a rotor on a rotating side having a rotor side coil pattern 1 folded in a zigzag manner and formed into an annular shape on the whole as shown in FIG. 27A; and a stator on a fixed side having a stator side coil pattern 2 folded in a zigzag manner and formed into an annular shape on the whole as shown in FIG. 27B. Here, the rotor and the stator are disposed to face each other so that the rotor side coil pattern 1 and the stator side coil pattern 2 can face each other.

In this rotary scale, when an alternating current is supplied to the stator side coil pattern 2, an induced voltage is generated on the rotor side coil pattern 1. As shown in FIG. 28, the induced voltage varies periodically (where a period=one pitch of the rotor side coil pattern 1) with a rotation angle of the rotor (the rotor side coil pattern 1) (i.e. with variation in the degree of electromagnetic coupling corresponding to variation in a positional correlation between the stator side coil pattern 2 and the rotor side coil pattern 1). This induced voltage is transmitted from the rotating side to the fixed side through transformers incorporated respectively in the rotating side and the fixed side. Accordingly, the rotation angle of the rotor (a rotating shaft joined to the rotor in a machine tool or the like) can be detected by use of an amount of variation in this induced voltage.

Although illustration is omitted herein, the linear scale is for detecting an amount of linear displacement, and is configured of: a slider on a sliding side having a slider side coil pattern folded in a zigzag manner and formed into a linear shape on the whole; and a scale on a fixed side having a scale side coil pattern folded in a zigzag manner and formed into a linear shape on the whole. Here, the slider and the scale are disposed to face each other so that the slider side coil pattern and the scale side coil pattern can face each other.

In this linear scale, when an alternating current is supplied to the slider side coil pattern, an induced voltage that varies periodically is generated on the scale side coil pattern. The induced voltage varies periodically (where a period=one pitch of the scale side coil pattern) with an amount of linear displacement of the slider (the slider side coil pattern) (i.e. with variation in the degree of electromagnetic coupling corresponding to variation in a positional correlation between the slider side coil pattern and the scale side coil pattern). Accordingly, it is possible to detect the amount of linear displacement (a linear movement distance) of the slider (such as a linear motion shaft of a machine tool or the like joined to the slider) by use of an amount of variation in this induced voltage.

Moreover, a rotary absolute value scale capable of detecting an absolute value of a rotation angle (an absolute angle) and a linear absolute value scale capable of detecting an absolute value of an amount of linear displacement (an absolute amount of displacement) are also developed today as absolute value scales obtained by applying the inductosyn type rotary scale and the inductosyn type linear scale as described above.

The rotary absolute value scale is configured of: a rotor on a rotating side having two rotor side coil patterns 5 and 6 with different pitches which are folded in a zigzag manner and formed into annular shapes on the whole as shown in FIG. 29A; and a stator on a fixed side having two stator side coil patterns 7 and 8 with different pitches which are folded in a zigzag manner and formed into annular shapes on the whole as shown in FIG. 29B. Here, the rotor and the stator are disposed to face each other so that the rotor side coil patterns 5 and 6 can face the stator side coil patterns 7 and 8, respectively. Moreover, the rotor side coil patterns 5 and 6 are provided with different pitches Pm [degrees] and Ps [degrees] (where Ps<Pm), respectively, and are formed in the same plane. The stator side coil patterns 7 and 8 are also provided with different pitches Pm' [degrees] and Ps' [degrees] (where Ps'<Pm'), respectively, corresponding to the pitches Pm and Ps of the rotor side coil patterns 5 and 6, and are formed in the same plane.

The configuration of the stator will now be described more in detail with reference to FIGS. 30A and 30B. As shown in FIGS. 30A and 30B, the stator side coil patterns 7 and 8 are formed on a stator 9 by attaching a copper foil onto a surface of a base member 10 with an insulating member 11 interposed therebetween, and then processing this copper foil by use of lithography or the like to form predetermined coil patterns. Moreover, a wiring groove 14 is formed on the base member 10 so that the stator side coil patterns 7 and 8 are electrically connected to an external wire 15 through an internal wire 13 that is provided in this wiring groove 14. A secondary coil 12 of a transformer 16 is also provided in the wiring groove 14 formed on the base member 10. Although illustration is omitted herein, the rotor has a configuration similar to the stator, and is obtained by forming the rotor side coil patterns 5 and 6 by use of a copper foil attached onto a base member with an insulating member interposed therebetween. Here, an internal wire and a primary coil of the transformer 16 are provided in a wiring groove that is formed on the base member.

In this rotary absolute value scale, when an alternating current is supplied to the stator side coil patterns 7 and 8, induced voltages are generated on the rotor side coil patterns 5 and 6. The induced voltages vary periodically (where a period=each of one pitch Ps and one pitch Pm of the rotor side coil patterns 5 and 6) with rotation angles of the rotor (the rotor side coil patterns 5 and 6). These induced voltages are respectively transmitted from the rotating side to the fixed side through the transformers 16 incorporated in the rotating side and the fixed side. Accordingly, it is possible to detect the absolute angle of the rotor (such as a rotating shaft of a machine tool or the like joined to the rotor) by use of a difference in the detected angle between the amounts of variation in these induced voltages.

The linear absolute value scale is configured of: a slider on a sliding side having two slider side coil patterns 21 and 22 with different pitches which are folded in a zigzag manner and formed into linear shapes on the whole as shown in FIG. 31A; and a scale on a fixed side having two scale side coil patterns 23 and 24 with different pitches which are folded in a zigzag manner and formed into linear shapes on the whole as shown in FIG. 31B. Here, the slider and the scale are disposed to face each other so that the slider side coil patterns 21 and 22 can face the scale side coil patterns 23 and 24, respectively. Moreover, the scale side coil patterns 23 and 24 are provided with different pitches Pm [mm] and Ps [mm] (where Ps<Pm), respectively, and the slider side coil patterns 21 and 22 are also provided with different pitches Pm' [degrees] and Ps' [degrees] (where Ps'<Pm'), respectively corresponding to the pitches Pm and Ps of the scale side coil patterns 23 and 24, which are formed in the same plane.

The configuration of the slider will now be described more in detail with reference to FIGS. 32A and 32B. As shown in FIGS. 32A and 32B, the slider side coil patterns 21 and 22 are formed on a slider 25 by attaching a copper foil onto a surface of a base member 26 with an insulating member 27 interposed therebetween and then by processing this copper foil to form predetermined coil patterns by use of lithography or the like. Moreover, a wiring groove 28 is formed on the base member 26 so that the slider side coil patterns 21 and 22 can be electrically connected to an external wire 30 through an internal wire 29 that is provided in this wiring groove 28. Although illustration is omitted herein, the scale is configured as similar to the slider by forming the scale side coil patterns 23 and 24 by use of a copper foil attached onto a base member with an insulating member interposed therebetween. Here, the scale side coil patterns 23 and 24 are electrically connected to an external wire through an internal wire that is provided in a wiring groove formed on the base member.

In this linear absolute value scale, when an alternating current is supplied to the slider side coil patterns 21 and 22, induced voltages are generated on the scale side coil patterns 23 and 24. The induced voltages vary periodically (where a period=each of one pitch Ps and one pitch Pm of the scale side coil patterns 23 and 24) with amounts of linear displacement of the scale (the scale side coil patterns 23 and 24). Accordingly, the absolute amount of displacement of the slider (such as a linear motion shaft of a machine tool or the like joined to the slider) can be detected by use of a difference in the amount of displacement between the amounts of variation in these induced voltages.

<Patent Document 1> Japanese Patent Application Laid-open Publication No. Hei 11-083545

In the case of the conventional rotary absolute value scale described above, the rotor side coil patterns 5 and 6 are formed in the same plane while the stator side coil patterns 7 and 8 are also formed in the same plane. Accordingly, in order to avoid an increase in the size of the entire absolute value scale, it is inevitable to reduce the space occupied by each of the coil patterns 5, 6, 7, and 8 (the lengths in a radial direction of each of the coil patterns 5, 6, 7, and 8). As a consequence, detection accuracy is more likely to be affected by manufacturing variation among the absolute value scales, and thus stable detection accuracy is difficult to obtain.

Similarly, in the case of the conventional linear absolute value scale described above, the slider side coil patterns 21 and 22 are formed in the same plane while the scale side coil patterns 23 and 24 are also formed in the same plane. Accordingly, in order to avoid an increase in the size of the entire absolute value scale, it is inevitable to reduce the space occupied by each of the coil patterns 21, 22, 23, and 24 (the lengths in a width direction of each of the coil patterns 21, 22, 23, and 24). As a consequence, detection accuracy is prone to be affected by manufacturing variation among the absolute value scales, and thus stable detection accuracy is difficult to obtain.

Moreover, there has also been a demand for a calculation method capable of easily and reliably calculating the absolute angle or the absolute amount of displacement with the absolute value scale.

SUMMARY OF THE INVENTION

The present invention has been made in view of the foregoing problems. An object of the present invention is to provide rotary and linear absolute value scales capable of increasing space occupied by each coil pattern (lengths in a radial direction and a width direction of each coil pattern) without increasing the size of the entire absolute value scales, and also capable of easily and reliably calculating the absolute angle and the absolute amount of displacement with the absolute value scales.

To attain the object, an absolute value scale according to a first aspect of the present invention provides an absolute value scale including a slider having multiple slider side coil patterns each provided with a different pitch and a scale having multiple scale side coil patterns each provided with a different pitch where the slider and the scale are disposed to face each other so that the slider side coil patterns and the scale side coil patterns can face one another, in which the slider side coil patterns are laminated, and the scale side coil patterns are laminated.

Here, the absolute value scale is any of a rotary absolute value scale and a linear absolute value scale. The slider side coil patterns correspond to any of stator side coil patterns of the rotary absolute value scale and slider side coil patterns of the linear absolute value scale. The slider corresponds to any of a stator of the rotary absolute value scale and a slider of the linear absolute value scale. The scale side coil patterns corresponds to any of rotor side coil patterns of the rotary absolute value scale and scale side coil patterns of the linear absolute value scale. The scale corresponds to any of a rotor of the rotary absolute value scale and a scale of the linear absolute value scale.

Meanwhile, an absolute value scale according to a second aspect of the preset invention provides the absolute value scale of the first aspect, which includes feeding means for supplying alternating currents to each of the slider side coil patterns of the slider at different timings.

Meanwhile, an absolute value scale according to a third aspect of the present invention provides the absolute value scale of the first aspect, which includes feeding means for supplying alternating currents having different frequencies to each of the slider side coil patterns of the slider, and filters provided on each of output ends of the scale side coil patterns of the scale and configured to cut off a voltage having a frequency different from the frequency of an original induced voltage in each of the scale side coil patterns.

Meanwhile, an absolute value scale according to a fourth aspect of the present invention provides the absolute value scale of the third aspect, in which the feeding means supplies the alternating currents to each of the slider side coil patterns of the slider at different timings.

Meanwhile, an absolute value scale according to a fifth aspect of the present invention provides the absolute value scale of any of the first to fourth aspect. Here, in the case where the absolute scale is a rotary absolute scale, the slider side coil patterns correspond to stator side coil patterns of the rotary absolute value scale; the slider corresponds to a stator of the rotary absolute value scale; the scale side coil patterns correspond to rotor side coil patterns of the rotary absolute value scale; and the scale corresponds to a rotor of the rotary absolute value scale. The rotor includes a first rotor side coil pattern and a second rotor side coil pattern having mutually different pitches, and the stator includes a first stator side coil pattern and a second stator side coil pattern each provided with a different pitch. Moreover, in the absolute value scale, a relation between the pitch Pm of the first rotor side coil pattern and the pitch Ps of the second rotor side coil pattern is set to satisfy $Ps=360/((360/Pm)+1)$, and a positional relation between the first and second rotor side coil patterns and the first and second stator side coil patterns is set such that both of a detected angle $\theta m$ found on the basis of an induced voltage of the first rotor side coil pattern and a detected angle Os found on the basis of an induced voltage of the second rotor side coil pattern become equal to 0° when an absolute angle of the rotor is equal to 0°. Furthermore, the absolute value scale includes calculating means for finding the detected angle Om on the basis of the induced voltage of the first rotor side coil pattern, finding the detected angle Os on the basis of the induced voltage of the second rotor side coil pattern, finding a value D on the basis of a formula D=Os−Om, finding a value E on the basis of a formula E=D+Ps when the value D is a negative value, finding the value E on the basis of a formula E=D when the value D is a nonnegative value, and finding an absolute angle Z of the rotor on the basis of a formula Z=E× 360/Ps+Om. Meanwhile, in the case where the absolute scale is a linear absolute scale, the slider side coil patterns correspond to slider side coil patterns of the linear absolute value scale, the slider corresponds to a slider of the linear absolute value scale, the scale side coil patterns correspond to scale side coil patterns of the linear absolute value scale, and the scale corresponds to a scale of the linear absolute value scale. The slider includes a first slider side coil pattern and a second slider side coil pattern each provided with a different pitch, and the scale includes a first scale side coil pattern and a second scale side coil pattern each provided with a different pitch. Moreover, in the absolute value scale, a relation between the pitch Pm of the first scale side coil pattern and the pitch Ps of the second scale side coil pattern is set to satisfy Ps=L/((L/Pm)+1) where L is a detected amount of displacement of the entire linear absolute value scale, and a positional relation between the first and second slider side coil patterns and the first and second scale side coil patterns is set such that both of a detected amount of displacement Om found on the basis of an induced voltage of the first scale side coil pattern and a detected amount of displacement Os found on the basis of an induced voltage of the second scale side coil pattern become equal to 0 mm when an absolute amount of displacement of the slider is equal to 0 mm. Furthermore, the absolute value scale includes calculating means for finding the detected amount of displacement Om on the basis of the induced voltage of the first scale side coil pattern, finding the detected amount of displacement Os on the basis of the induced voltage of the second scale side coil pattern, finding a value D on the basis of a formula D=Os−Om, finding a value E on the basis of a formula E=D+Ps when the value D is a negative value, finding the value E on the basis of a formula E=D when the value D is a nonnegative value, and finding an absolute amount of displacement Z of the slider on the basis of a formula Z=E×L/Ps+Om.

Meanwhile, an absolute value scale according to a sixth aspect of the present invention provides the absolute value scale of the fifth aspect, in which, in the case where the absolute value scale is the rotary absolute value scale, the operating means corrects both of the detected angles Om and Os to become equal to 0° when the absolute angle of the rotor is equal to 0°, according to deviation amounts of the detected angles Om and Os from 0° obtained by a preliminary experiment when the absolute angle of the rotor is equal to 0°. Meanwhile, in the case where the absolute value scale is the linear absolute value scale, the operating means corrects both of the detected amounts of displacement Om and Os to become equal to 0 mm when the absolute amount of displacement of the slider is equal to 0 mm, according to deviation amounts of the detected amounts of displacement Om and Os from 0 mm obtained by a preliminary experiment when the absolute amount of displacement of the slider is equal to 0 mm.

Meanwhile, an absolute value scale according to a seventh aspect of the present invention provides an absolute value scale including a slider having a first slider side coil pattern and a second slider coil pattern each provided with a different pitch and a scale having a first scale side pattern and a second scale side coil pattern each provided with a different pitch where the slider and the scale are disposed to face each other so that the first and second slider side coil patterns and the first and second scale side coil patterns can face one another. Here, in the case where the absolute scale is a rotary absolute scale, the first side coil pattern and the second slider side coil pattern respectively correspond to a first stator side coil pattern and a second stator side coil pattern of the rotary absolute value scale, the slider corresponds to a stator of the rotary absolute value scale, the first scale side coil pattern and the second scale side coil pattern respectively correspond to a first rotor side coil pattern and a second rotor side coil pattern of the rotary absolute value scale, and the scale corresponds to a rotor of the rotary absolute value scale. Moreover, in the absolute value scale, a relation between the pitch Pm of the first rotor side coil pattern and the pitch Ps of the second rotor side coil pattern is set to satisfy Ps=360/((360/Pm)+1), and a positional relation between the first and second rotor side coil patterns and the first and second stator side coil patterns is set such that both of a detected angle Om found on the basis of an induced voltage of the first rotor side coil pattern and a detected angle Os found on the basis of an induced voltage of the second rotor side coil pattern become equal to 0° when an absolute angle of the rotor is equal to 0°. Furthermore, the absolute value scale includes calculating means for finding the detected angle Om on the basis of the induced voltage of the first rotor side coil pattern, finding the detected angle Os on the basis of the induced voltage of the second rotor side coil pattern, finding a value D on the basis of a formula D=Os−Om, finding a value E on the basis of a formula E=D+ Ps when the value D is a negative value, finding the value E on the basis of a formula E=D when the value D is a nonnegative value, and finding an absolute angle Z of the rotor on the basis of a formula Z=E×360/Ps+Om. Meanwhile, in the case where the absolute scale is a linear absolute scale, the first slider side coil pattern and the second slider side coil pattern respectively correspond to a first slider side coil pattern and a second scale side coil pattern of the linear absolute value scale, the slider corresponds to a slider of the linear absolute value scale, the first scale side coil pattern and a second scale side coil pattern respectively correspond to a first scale side coil pattern and a second scale side coil pattern of the linear absolute value scale, and the scale corresponds to a scale of the linear absolute value scale. Moreover, in the absolute value scale, a relation between the pitch Pm of the first scale side coil pattern and the pitch Ps of the second scale side coil pattern is set to satisfy Ps=L/((L/Pm)+1) where L is a detected amount of displacement of the entire linear absolute value scale, and a positional relation between the first and second slider side coil patterns and the first and second scale side coil patterns is set such that both of a detected amount of displacement Om found on the basis of an induced voltage of the first scale side coil pattern and a detected amount of displacement Os found on the basis of an induced voltage of the second scale side coil pattern become equal to 0 mm when an absolute amount of displacement of the slider is equal to 0 mm. Furthermore, the absolute value scale includes calculating means for finding the detected amount of displacement Om on the basis of the induced voltage of the first scale side coil pattern, finding the detected amount of displacement Os on the basis of the induced voltage of the second scale side coil pattern, finding a value D on the basis of a formula D=Os−Om, finding a value E on the basis of a formula E=D+Ps when the value D is a negative value, finding the value E on the basis of a formula E=D when the value D is a nonnegative value, and finding an absolute amount of displacement Z of the slider on the basis of a formula Z=E×L/Ps+Om.

Meanwhile, an absolute value scale according to an eighth aspect of the present invention provides the absolute value scale of the seventh aspect, in which, in the case where the absolute value scale is the rotary absolute value scale, the operating means corrects both of the detected angles Om and Os to 0° when the absolute angle of the rotor is equal to become equal to 0°, according to deviation amounts of the detected angles Om and Os from 0° obtained by a preliminary experiment when the absolute angle of the rotor is equal to 0°. Meanwhile, in the case where the absolute value scale is the linear absolute value scale, the operating means corrects both of the detected amounts of displacement Om and Os to become equal to 0 mm when the absolute amount of displacement of the slider is equal to 0 mm, according to deviation amounts of the detected amounts of displacement Om and Os from 0 mm obtained by a preliminary experiment when the absolute amount of displacement of the slider is equal to 0 mm obtained by a preliminary experiment.

Meanwhile, a method of calculating an absolute value according to a ninth aspect of the present invention provides a method of calculating an absolute value of an amount of displacement of a slider in an absolute value scale including the slider having a first slider side coil pattern and a second slider coil pattern each provided with a different pitch and a scale having a first scale side pattern and a second scale side coil pattern each provided with a different pitch where the slider and the scale are disposed to face each other so that the first and second slider side coil patterns and the first and second scale side coil patterns can face one another. Here, in the case where the absolute scale is a rotary absolute scale, the first side coil pattern and the second slider side coil pattern respectively correspond to a first stator side coil pattern and a second stator side coil pattern of the rotary absolute value scale, the slider corresponds to a stator of the rotary absolute value scale, the first scale side coil pattern and the second scale side coil pattern respectively correspond to a first rotor side coil pattern and a second rotor side coil pattern of the rotary absolute value scale, the scale corresponds to a rotor of the rotary absolute value scale, and the absolute value of the amount of displacement of the slider corresponds to an absolute angle of the rotor of the rotary absolute value scale. Moreover, a relation between the pitch Pm of the first rotor side coil pattern and the pitch Ps of the second rotor side coil pattern is set to satisfy Ps=360/((360/Pm)+1), and a positional relation between the first and second rotor side coil patterns and the first and second stator side coil patterns is set such that both of a detected angle Om found on the basis of an induced voltage of the first rotor side coil pattern and a detected angle Os found on the basis of an induced voltage of the second rotor side coil pattern become equal to 0° when the absolute angle of the rotor is equal to 0°. Furthermore, the method includes the step of finding the detected angle Om on the basis of the induced voltage of the first rotor side coil pattern, finding the detected angle Os on the basis of the induced voltage of the second rotor side coil pattern, finding a value D on the basis of a formula D=Os−Om, finding a value E on the basis of a formula of E=D+Ps when the value D is a negative value, finding the value E on the basis of a formula E=D when the value D is a nonnegative value, and finding an absolute angle Z of the rotor on the basis of a formula Z=E×360/Ps+Om. Meanwhile, in the case where the absolute scale is a linear absolute scale, the first slider side coil pattern and the second slider side coil pattern respectively correspond to a first slider side coil pattern and a second scale side coil pattern of the linear absolute value scale, the slider corresponds to a slider of the linear absolute value scale, the first scale side coil pattern and a second scale side coil pattern respectively correspond to a first scale side coil pattern and a second scale side coil pattern of the linear absolute value scale, the scale corresponds to a scale of the linear absolute value scale, and the absolute value of the amount of displacement of the slider corresponds to an absolute amount of displacement of the slider of the linear absolute value scale. Moreover, a relation between the pitch Pm of the first scale side coil pattern and the pitch Ps of the second scale side coil pattern is set to satisfy Ps=L/((L/Pm)+1) where L is a detected amount of displacement of the entire linear absolute value scale, and a positional relation between the first and second slider side coil patterns and the first and second scale side coil patterns is set such that both of a detected amount of displacement Om found on the basis of an induced voltage of the first scale side coil pattern and a detected amount of displacement Os found on the basis of an induced voltage of the second scale side coil pattern become equal to 0 mm when the absolute amount of displacement of the slider is equal to 0 mm. Furthermore, the method includes the step of finding the detected amount of displacement Om on the basis of the induced voltage of the first scale side coil pattern, finding the detected amount of displacement Os on the basis of the induced voltage of the second scale side coil pattern, finding a value D on the basis of a formula D=Os−Om, finding a value E on the basis of a formula E=D+Ps when the value D is a negative value, finding the value E on the basis of a formula E=D when the value D is a nonnegative value, and finding an absolute amount of displacement Z of the slider on the basis of a formula Z=E×L/Ps+Om.

Meanwhile, a method of calculating an absolute value according to a tenth aspect of the present invention provides the method of calculating an absolute value of the ninth aspect, in which, in the case where the absolute value scale is the rotary absolute value scale, both of the detected angles Om and Os to 0 are corrected to become 0° when the absolute angle of the rotor is equal to 0°, according to deviation amounts of the detected angles Om and Os from 0° obtained by a preliminary experiment when the absolute angle of the rotor is equal to 0°. Meanwhile, in the case where the absolute value scale is the linear absolute value scale, both of the detected amounts of displacement Om and Os are corrected to become 0 mm when the absolute amount of displacement of the slider is equal to 0 mm, according to deviation amounts of the detected amounts of displacement Om and Os from 0 mm obtained by a preliminary experiment when the absolute amount of displacement of the slider is equal to 0 mm.

According to the absolute value scale of the first aspect, the multiple slider side coil patterns are laminated and the multiple scale side coil patterns are also laminated. Accordingly, unlike a conventional case of providing multiple coil patterns in the same plane, it is possible to increase space occupied by each of the coil patterns (lengths in a radial direction of the respective coil patterns) without increasing the size of the entire absolute value scale. As a consequence, it is possible to reduce an adverse effect attributable to manufacturing variation of the absolute value scale, and detection accuracy of the absolute amount of displacement of the slider (the absolute angle of the rotor of the rotary absolute value scale or the absolute amount of displacement of the linear absolute value scale) is thereby stabilized.

According to the absolute value scale of the second aspect, the absolute value scale includes the feeding means for supplying alternating currents to each of the slider side coil patterns of the slider at different timings. Accordingly, even in the case of the structure formed by laminating the multiple slider side coil patterns and laminating the multiple scale side coil patterns, it is possible to ensure detection accuracy of the absolute amount of displacement of the slider (the absolute angle of the rotor of the rotary absolute value scale or the absolute amount of displacement of the linear absolute value scale) while reducing electromagnetic interferences between these layers.

According to the absolute value scale of the third aspect, the absolute value scale includes the feeding means for supplying alternating currents having different frequencies to each of the slider side coil patterns of the slider, and the filters provided on each of output ends of the scale side coil patterns of the scale and configured to cut off a voltage having a frequency different from the frequency of an original induced voltage in each of the scale side coil patterns. Accordingly, even in the case of the structure formed by laminating the multiple slider side coil patterns and laminating the multiple scale side coil patterns, it is possible to ensure detection accuracy of the absolute amount of displacement of the slider (the absolute angle of the rotor of the rotary absolute value scale or the absolute amount of displacement of the linear absolute value scale) while reducing electromagnetic interferences between these layers.

According to the absolute value scale of the fourth aspect, the feeding means supplies the alternating currents to each of the slider side coil patterns of the slider at different timings. Accordingly, it is possible to ensure detection accuracy of the absolute amount of displacement of the slider (the absolute angle of the rotor of the rotary absolute value scale or the absolute amount of displacement of the linear absolute value scale) more reliably while reducing electromagnetic interferences between these layers.

According to the absolute value scale of the fifth aspect, in the case where the absolute scale is a rotary absolute scale, the absolute value scale includes the calculating means for setting a relation between a pitch Pm of the first rotor side coil pattern and a pitch Ps of the second rotor side coil pattern to satisfy $Ps=360/((360/Pm)+1)$, setting positional relations between the first and second rotor side coil patterns and the first and second stator side coil patterns such that both of a detected angle Om found on the basis of an induced voltage of the first rotor side coil pattern and a detected angle Os found on the basis of an induced voltage of the second rotor side coil pattern become equal to 0° when an absolute angle of the rotor is equal to 0°, and finding the detected angle Om on the basis of the induced voltage of the first rotor side coil pattern, finding the detected angle Os on the basis of the induced voltage of the second rotor side coil pattern, finding a value D on the basis of a formula $D=Os-Om$, finding a value E on the basis of a formula $E=D+Ps$ when the value D is a negative value, finding the value E on the basis of a formula $E=D$ when the value D is a nonnegative value, and finding an absolute angle Z of the rotor on the basis of a formula $Z=E\times 360/Ps+Om$. Meanwhile, in the case where the absolute scale is a linear absolute scale, the absolute value scale includes the calculating means for setting a relation between the pitch Pm of the first scale side coil pattern and the pitch Ps of the second scale side coil pattern to satisfy $Ps=L/((L/Pm)+1)$ where L is a detected amount of displacement of the entire linear absolute value scale, setting positional relations between the first and second slider side coil patterns and the first and second scale side coil patterns such that both of a detected amount of displacement Om found on the basis of an induced voltage of the first scale side coil pattern and a detected amount of displacement Os found on the basis of an induced voltage of the second scale side coil pattern become equal to 0 mm when an absolute amount of displacement of the slider is equal to 0 mm, and finding the detected amount of displacement Om on the basis of the induced voltage of the first scale side coil pattern, finding the detected amount of displacement Os on the basis of the induced voltage of the second scale side coil pattern, finding a value D on the basis of a formula of $D=Os-Om$, finding a value E on the basis of a formula of $E=D+Ps$ when the value D is a negative value, finding the value E on the basis of a formula of $E=D$ when the value D is a nonnegative value, and finding an absolute amount of displacement Z of the slider on the basis of a formula of $Z=E\times L/Ps+Om$. Accordingly, it is possible to calculate the absolute angle of the rotor of the rotary absolute value scale or the absolute amount of displacement of the linear absolute value scale easily and reliably.

According to the absolute value scale of the sixth aspect, in the case where the absolute value scale is the rotary absolute value scale, the operating means corrects both of the detected angles Om and Os to 0° when the absolute angle of the rotor is equal to 0°, according to deviation amounts of the detected angles Om and Os from 0° obtained by a preliminary experiment when the absolute angle of the rotor is equal to 0°. Meanwhile, in the case where the absolute value scale is the linear absolute value scale, the operating means corrects both of the detected amounts of displacement Om and Os to 0 mm when the absolute amount of displacement of the slider is equal to 0 mm, according to deviation amounts of the detected amounts of displacement Om and Os from 0 mm obtained by a preliminary experiment when the absolute amount of displacement of the slider is equal to 0 mm. Accordingly, even if the absolute value scale contains manufacturing variation, it is possible to ensure detection accuracy of the absolute angle of the rotor of the rotary absolute value scale or the absolute amount of displacement of the linear absolute value scale.

According to the absolute value scale of the seventh aspect, in the case where the absolute scale is a rotary absolute scale, the absolute value scale includes the calculating means for setting a relation between the pitch Pm of the first rotor side coil pattern and the pitch Ps of the second rotor side coil pattern to satisfy $Ps=360/((360/Pm)+1)$, setting positional relations between the first and second rotor side coil patterns and the first and second stator side coil patterns such that both of a detected angle Om found on the basis of an induced voltage of the first rotor side coil pattern and a detected angle Os found on the basis of an induced voltage of the second rotor side coil pattern become equal to 0° when an absolute angle of the rotor is equal to 0°, and finding the detected angle Om on the basis of the induced voltage of the first rotor side coil pattern, finding the detected angle Os on the basis of the induced voltage of the second rotor side coil pattern, finding a value D on the basis of a formula $D=Os-Om$, finding a value E on the basis of a formula $E=D+Ps$ when the value D is a negative value, finding the value E on the basis of a formula $E=D$ when the value D is a nonnegative value, and finding an absolute angle Z of the rotor on the basis of a formula $Z=E\times 360/Ps+Om$. Meanwhile, in the case where the absolute scale is a linear absolute scale, the absolute value scale includes the calculating means for setting a relation between the pitch Pm of the first scale side coil pattern and the pitch Ps of the second scale side coil pattern to satisfy $Ps=L/((L/Pm)+1)$ where L is a detected amount of displacement of the entire linear absolute value scale, setting positional relations between the first and second slider side coil patterns and the first and second scale side coil patterns such that both of a detected amount of displacement Om found on the basis of an induced voltage of the first scale side coil pattern and a detected amount of displacement Os found on the basis of an induced voltage of the second scale side coil pattern become equal to 0 mm when an absolute amount of displacement of the slider is equal to 0 mm, and finding the detected amount of displacement Om on the basis of the induced voltage of the first scale side coil pattern, finding the detected amount of displacement Os on the basis of the induced voltage of the second scale side coil pattern, finding a value D on the basis of a formula D=Os−Om, finding a value E on the basis of a formula E=D+Ps when the value D is a negative value, finding the value E based on a formula E=D when the value D is a nonnegative value, and finding an absolute amount of displacement Z of the slider based on a formula Z=E×L/Ps+Om. Accordingly, it is possible to calculate the absolute angle of the rotor of the rotary absolute value scale or the absolute amount of displacement of the linear absolute value scale easily and reliably.

According to the absolute value scale of the eighth aspect, in the case where the absolute value scale is the rotary absolute value scale, the operating means corrects both of the detected angles Om and Os to become 0° when the absolute angle of the rotor is equal to 0°, according to deviation amounts of the detected angles Om and Os from 0° obtained by a preliminary experiment when the absolute angle of the rotor is equal to 0°. Meanwhile, in the case where the absolute value scale is the linear absolute value scale, the operating means corrects both of the detected amounts of displacement Om and Os to become 0 mm when the absolute amount of displacement of the slider is equal to 0 mm, according to deviation amounts of the detected amounts of displacement Om and Os from 0 mm obtained by a preliminary experiment when the absolute amount of displacement of the slider is equal to 0 mm. Accordingly, even if the absolute value scale contains manufacturing variation, it is possible to ensure detection accuracy of the absolute angle of the rotor of the rotary absolute value scale or the absolute amount of displacement of the linear absolute value scale.

According to the method of calculating an absolute value of the ninth aspect, in the case where the absolute scale used therein is a rotary absolute scale, the method includes the steps of setting a relation between the pitch Pm of the first rotor side coil pattern and the pitch Ps of the second rotor side coil pattern to satisfy Ps=360/((360/Pm)+1), setting positional relations between the first and second rotor side coil patterns and the first and second stator side coil patterns such that both of a detected angle Om found on the basis of an induced voltage of the first rotor side coil pattern and a detected angle Os found on the basis of an induced voltage of the second rotor side coil pattern become equal to 0° when the absolute angle of the rotor is equal to 0°, and finding the detected angle Om on the basis of the induced voltage of the first rotor side coil pattern, finding the detected angle Os on the basis of the induced voltage of the second rotor side coil pattern, finding a value D on the basis of a formula D=Os−Om, finding a value E on the basis of a formula E=D+Ps when the value D is a negative value, finding the value E on the basis of a formula E=D when the value D is a nonnegative value, and finding an absolute angle Z of the rotor on the basis of a formula Z=E×360/Ps+Om. Meanwhile, in the case where the absolute scale is a linear absolute scale, the method includes the steps of setting a relation between the pitch Pm of the first scale side coil pattern and the pitch Ps of the second scale side coil pattern to satisfy Ps=L/((L/Pm)+1) where L is a detected amount of displacement of the entire linear absolute value scale, setting positional relations between the first and second slider side coil patterns and the first and second scale side coil patterns such that both of a detected amount of displacement Om found on the basis of an induced voltage of the first scale side coil pattern and a detected amount of displacement Os found on the basis of an induced voltage of the second scale side coil pattern become equal to 0 mm when the absolute amount of displacement of the slider is equal to 0 mm, and finding the detected amount of displacement Om on the basis of the induced voltage of the first scale side coil pattern, finding the detected amount of displacement Os on the basis of the induced voltage of the second scale side coil pattern, finding a value D on the basis of a formula D=Os−Om, finding a value E on the basis of a formula E=D+Ps when the value D is a negative value, finding the value E on the basis of a formula E=D when the value D is a nonnegative value, and finding an absolute amount of displacement Z of the slider on the basis of a formula Z=E×L/Ps+Om. Accordingly, it is possible to calculate the absolute angle of the rotor of the rotary absolute value scale or the absolute amount of displacement of the linear absolute value scale easily and reliably.

According to the method of calculating an absolute value of the tenth aspect, in the case where the absolute value scale is the rotary absolute value scale, both of the detected angles Om and Os to 0 are corrected to become 0° when the absolute angle of the rotor is equal to 0°, according to deviation amounts of the detected angles Om and Os from 0° obtained by a preliminary experiment when the absolute angle of the rotor is equal to 0°. Meanwhile, in the case where the absolute value scale is the linear absolute value scale, both of the detected amounts of displacement Om and Os are corrected to become 0 mm when the absolute amount of displacement of the slider is equal to 0 mm, according to deviation amounts of the detected amounts of displacement Om and Os from 0 mm obtained by a preliminary experiment when the absolute amount of displacement of the slider is equal to 0 mm. Accordingly, even if the absolute value scale contains manufacturing variation, it is possible to ensure detection accuracy of the absolute angle of the rotor of the rotary absolute value scale or the absolute amount of displacement of the linear absolute value scale.

DETAILED DESCRIPTION OF THE INVENTION

Now, embodiments of the present invention will be described below in detail with reference to the accompanying drawings.

First Embodiment

Figure 1:
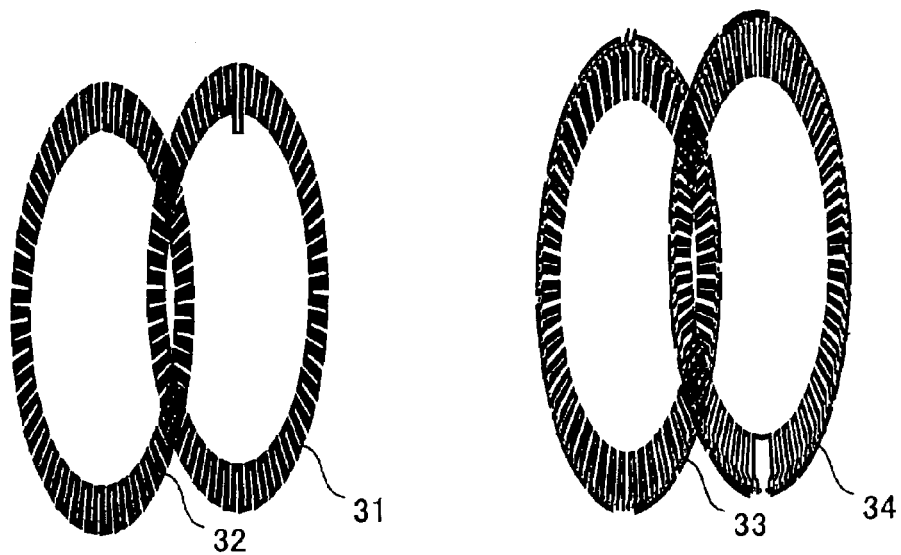
FIG. 1 is a perspective view of rotor side coil patterns and stator side coil patterns of a rotary absolute value scale according to a first embodiment of the present invention.
Figure 2A:
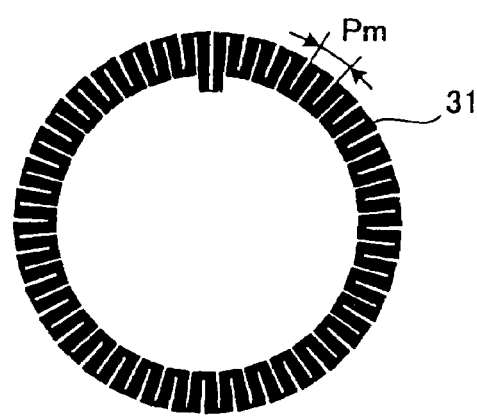
FIGS. 2A to 2D are front views of the rotor side coil patterns and the stator side coil patterns.
Figure 2C:
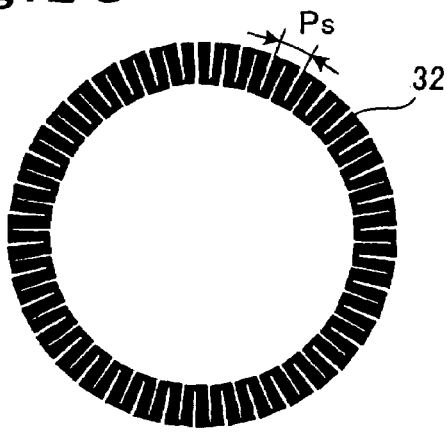
Figure 2B:
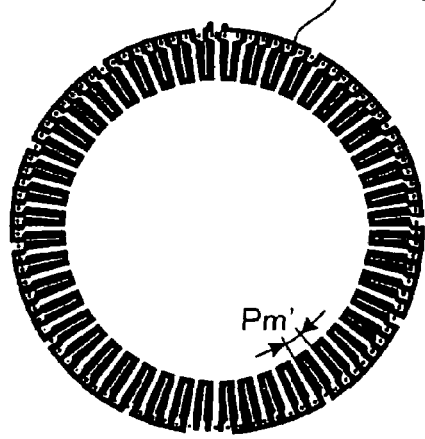
Figure 2D:
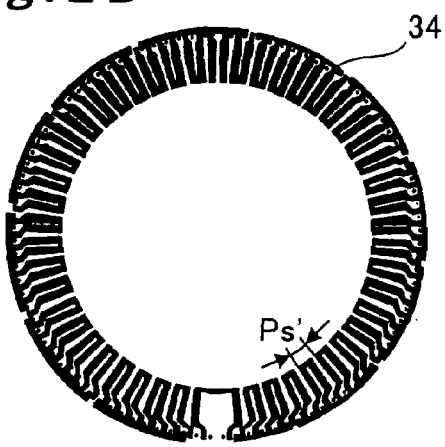
Figure 3A:
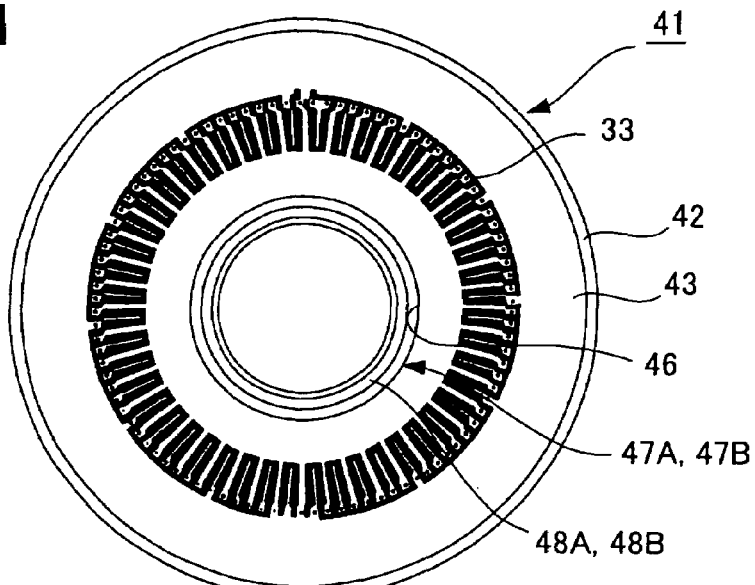
FIG. 3A is a front view of a stator constituting the rotary absolute value scale and FIG. 3B is a sectional side view of the stator constituting the rotary absolute value scale.
Figure 3B:
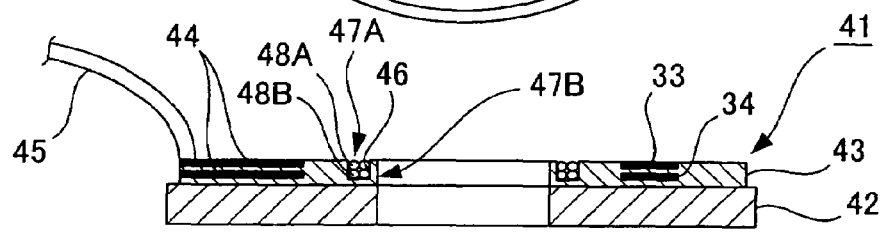
Figure 4A:
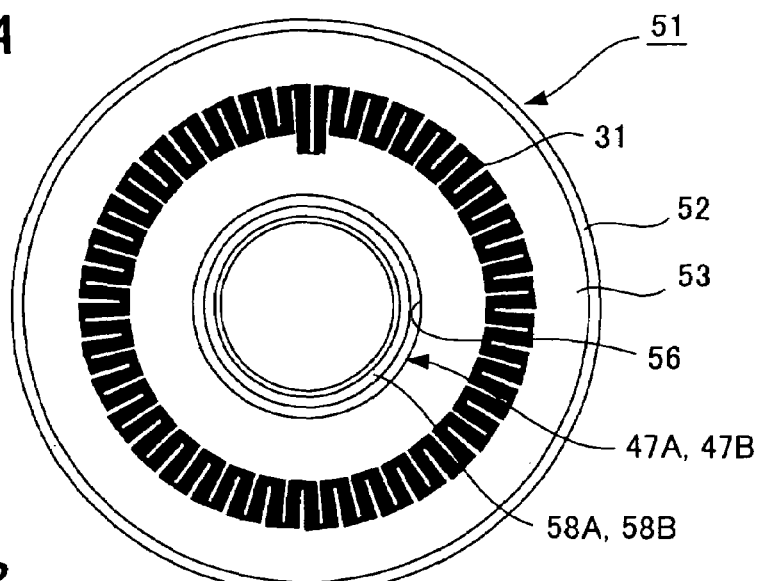
FIG. 4A is a front view of a rotor constituting the rotary absolute value scale and FIG. 4B is a sectional side view of the rotor constituting the rotary absolute value scale.
Figure 4B:
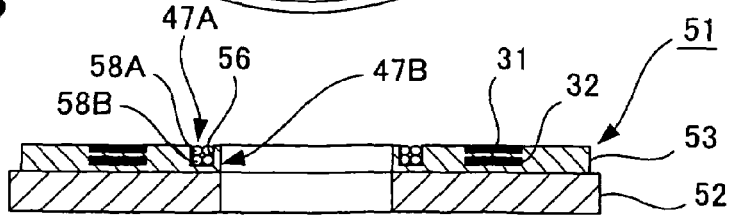
Figure 5:
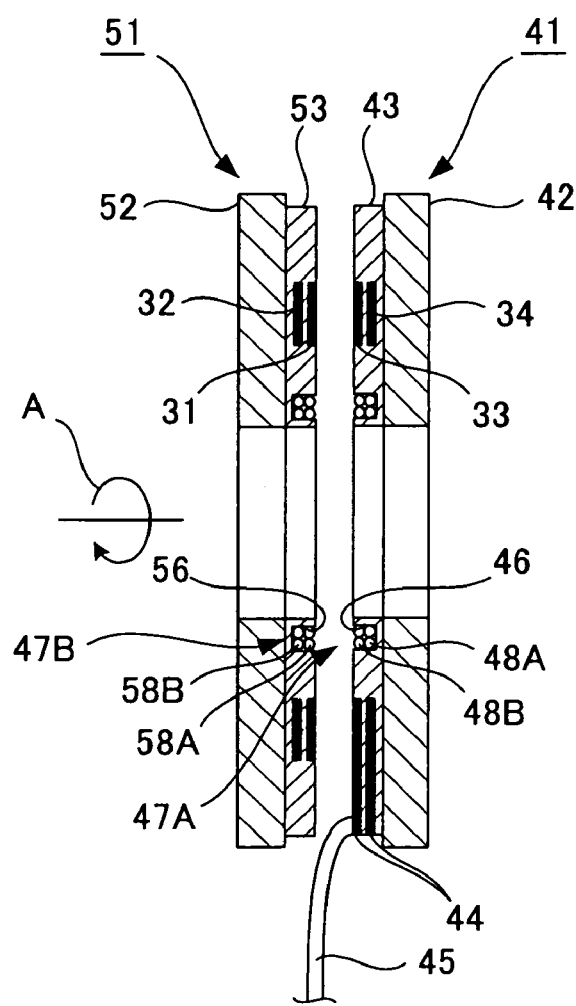
FIG. 5 is a sectional side view showing an overall configuration of the rotary absolute value scale.
Figure 6:
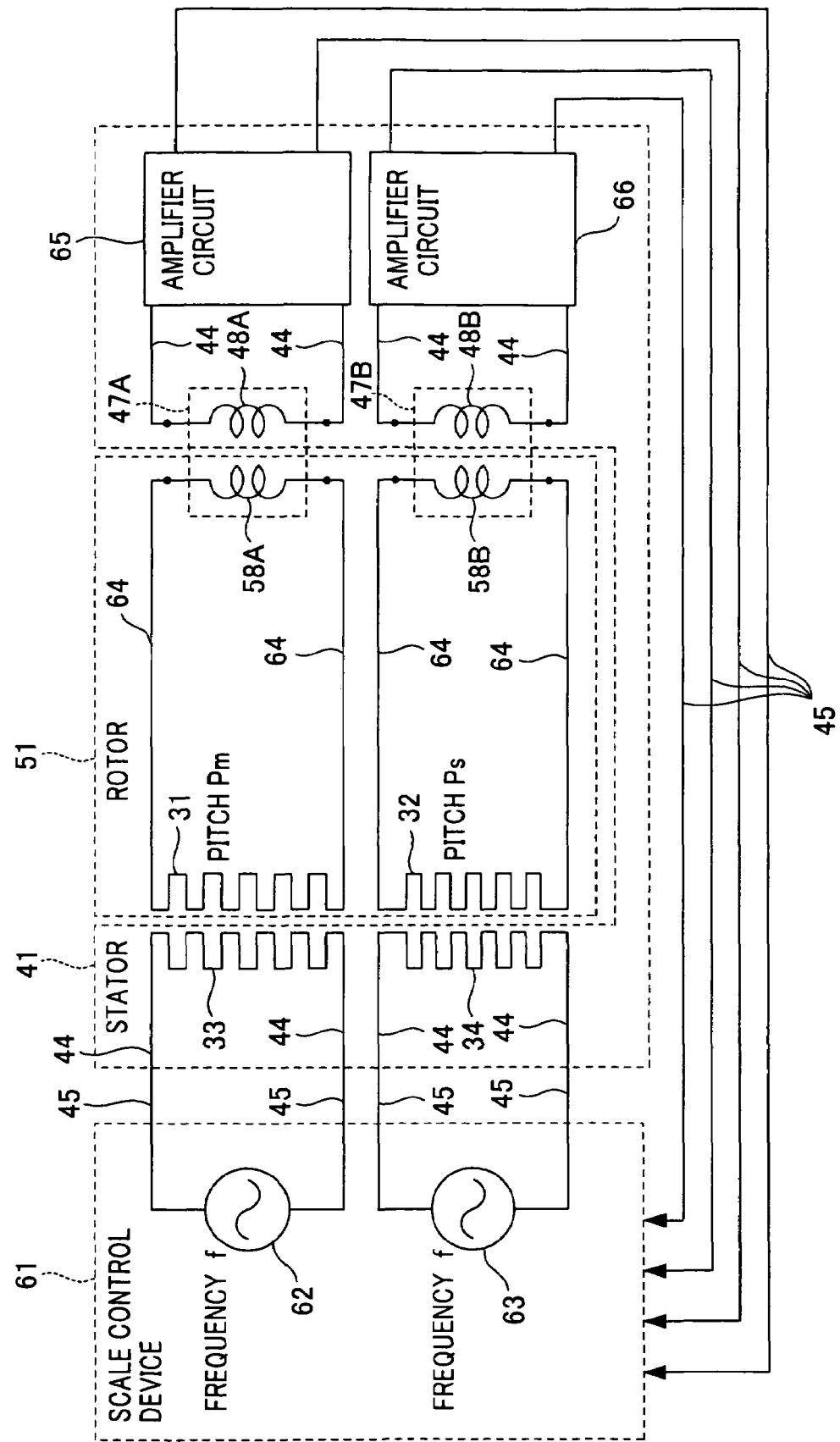
FIG. 6 is a diagram showing a circuit configuration of the rotary absolute value scale.
Figure 7:
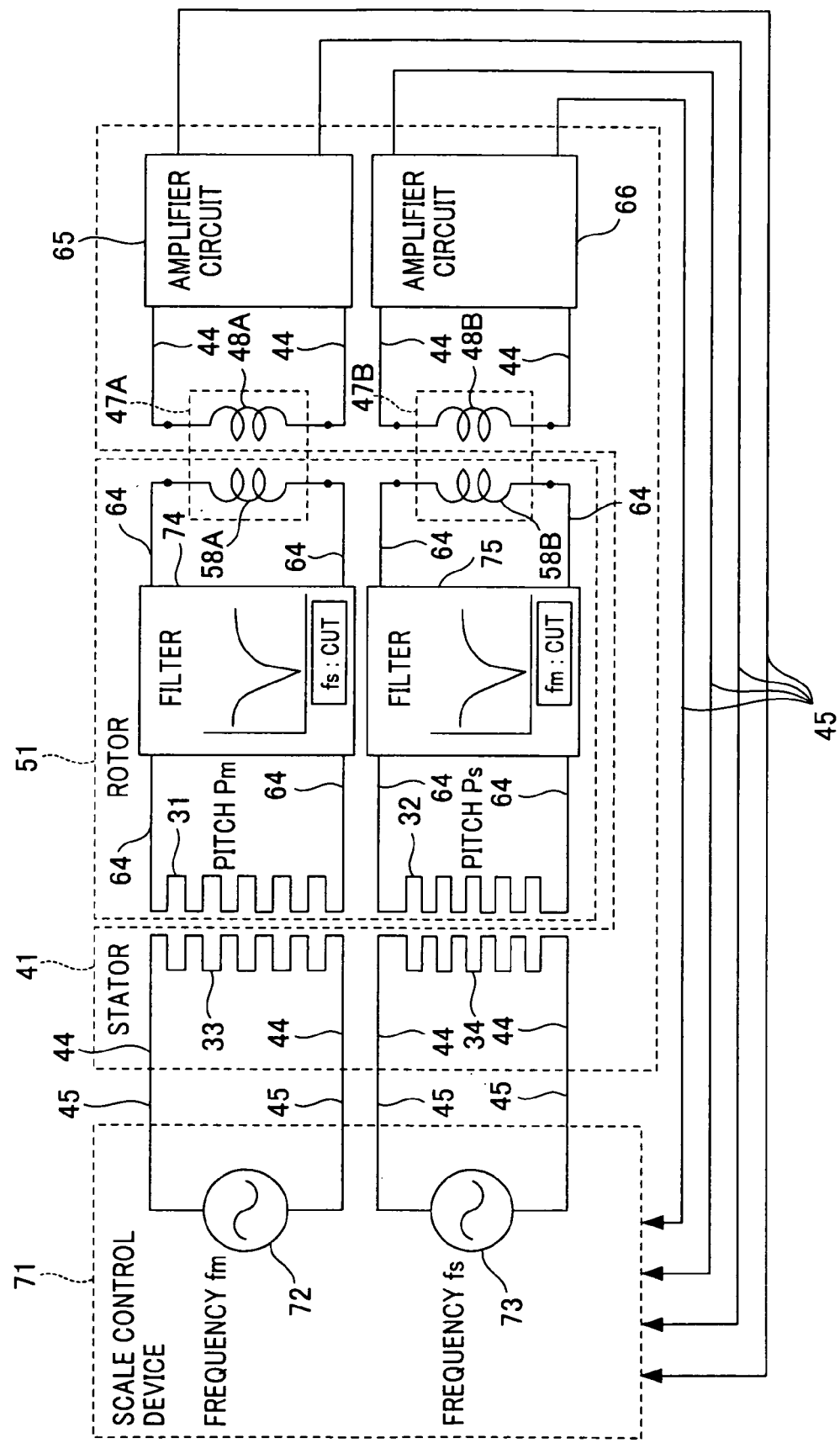
FIG. 7 is a diagram showing another circuit configuration of the rotary absolute value scale.

FIG. 1 is a perspective view of rotor side coil patterns and stator side coil patterns of a rotary absolute value scale according to a first embodiment of the present invention. FIGS. 2A to 2D are front views of the rotor side coil patterns and the stator side coil patterns. FIG. 3A is a front view and FIG. 3B is a sectional side view of a stator constituting the rotary absolute value scale. FIG. 4A is a front view and FIG. 4B is a sectional side view of a rotor constituting the rotary absolute value scale. FIG. 5 is a sectional side view showing an overall configuration of the rotary absolute value scale. FIG. 6 is a diagram showing a circuit configuration of the rotary absolute value scale. FIG. 7 is a diagram showing another circuit configuration of the rotary absolute value scale. FIGS. 8 to 13 are graphs for explaining contents of a process for calculating an absolute angle by use of a scale control device of the rotary absolute value scale.

The rotary absolute value scale of the first embodiment is an absolute value scale applying an inductosyn type rotary scale capable of detecting an absolute value of a rotation angle (an absolute angle). The rotary absolute value scale is configured of: a rotor on a rotating side having a rotor side coil pattern 31 (a first rotor side coil pattern) and a rotor side coil pattern 32 (a second rotor side coil pattern) both of which are provided with different pitches, folded in a zigzag manner and formed into annular shapes on the whole as shown in FIGS. 1, 2A and 2C; and a stator on a fixed side having a stator side coil pattern 33 (a first stator side coil pattern) and a stator side coil pattern 34 (a second stator side coil pattern) both of which are provided with different pitches, folded in a zigzag manner and formed into annular shapes on the whole as shown in FIGS. 1, 2B and 2D. As shown in FIG. 1, the rotor and the stator are disposed to face each other so that the rotor side coil patterns 31 and 32 can face the stator side coil patterns 33 and 34. Here, the rotor, the rotor side coil patterns, the stator, and the stator side coil patterns in this rotary absolute value scale respectively correspond to a scale, scale side coil patterns, a slider, and slider side coil patterns in a linear absolute value scale.

As shown in FIGS. 2A to 2D, the two rotor side coil patterns 31 and 32 are provided with different pitches Pm [degrees] and Ps [degrees] (where Ps<Pm), respectively, and the two stator side coil patterns 33 and 34 are also provided with different pitches Pm' [degrees] and Ps' [degrees] (where Ps'<Pm'), respectively, corresponding to the pitches Pm and Ps of the rotor side coil patterns 31 and 32.

Moreover, in the first embodiment, the two rotor side coil patterns 31 and 32 are laminated so as to be provided in different planes as shown in FIG. 1, instead of being provided in the same plane as in the conventional technique. In addition, the two stator side coil patterns 33 and 34 are also laminated so as to be provided in different planes as shown in FIG. 1, instead of being provided in the same plane as in the conventional technique.

Now, configurations of the stator and the rotor will be described further in detail with reference to FIGS. 3 to 5.

As shown in FIGS. 3A and 3B, a stator 41 of this rotary absolute value scale is formed by fixing, by use of fixing means such as an adhesive, a multilayer printed circuit board 43 onto a surface of a base member 42 for ensuring strength. Moreover, the stator side coil pattern 33 and the stator side coil pattern 34 are respectively printed on a first layer (a surface layer) and a second layer (an inner layer) of the multilayer printed circuit board 43, and the two layers are laminated. Meanwhile, internal wires 44 are also printed on the layers of the multilayer printed circuit board 43, and the stator side coil patterns 33 and 34 are electrically connected to external wires 45 through these internal wires 44. The external wires 45 are electrically connected to a scale control device (see FIGS. 6 and 7; to be described later in detail). Moreover, secondary coils 48A and 48B of transformers 47A and 47B are located in a wiring groove 46 formed on the multilayer printed circuit board 43.

As shown in FIGS. 4A and 4B, a rotor 51 of this rotary absolute value scale is formed by fixing, by use of fixing means such as an adhesive, a multilayer printed circuit board 53 onto a surface of a base member 52 for ensuring strength. Moreover, the rotor side coil pattern 31 and the rotor side coil pattern 32 are respectively printed on a first layer (a surface layer) and a second layer (an inner layer) of the multilayer printed circuit board 53, and the two layers are laminated. Moreover, primary coils 58A and 58B of the transformers 47A and 47B are located in a wiring groove 56 formed on the multilayer printed circuit board 53.

As shown in FIG. 5, the rotor 51 and the stator 41 are disposed to face each other so that the rotor side coil patterns 31 and 32 can face the stator side coil patterns 33 and 34. The rotor 51 is fitted to a rotating shaft of a machine tool or the like and is rotated as indicated with an arrow A together with the rotating shaft. Meanwhile, the stator 41 is fitted to a fixed part of the machine tool or the like. At this time, the primary coils 58 and the secondary coils 48 of the transformers 47 are also opposed to one another.

Next, circuit configurations of the rotary absolute value scale will be described with reference to FIGS. 6 and 7. The rotary absolute value scale may employ any of circuit configurations shown in FIGS. 6 and 7.

First, the circuit configuration in FIG. 6 will be described. As shown in the drawing, a scale control device 61, serving as a calculating means as well as a feeding means, includes two alternating current sources 62 and 63. The alternating current source 62 is electrically connected to the stator side coil pattern 33 of the stator 41 through the external wire 45 and the internal wire 44, and is configured to supply an alternating current having a frequency f to this stator side coil pattern 33. Meanwhile, the other alternating current source 63 is electrically connected to the stator side coil pattern 34 of the stator 41 through the external wire 45 and the internal wire 44, and is configured to supply an alternating current having a frequency f to this stator side coil pattern 34. Moreover, the scale control device 61 supplies the alternating currents to each of the stator side coil patterns 33 and 34 of the stator 41 at different timings. Specifically, the electric supply from the alternating current source 62 to the stator side coil pattern 33, and the electric supply from the alternating current source 63 to the stator side coil pattern 34 are executed not simultaneously but at shifted timings.

The primary coil 58A of the transformer 47A is electrically connected to the rotor side coil pattern 31 of the rotor 51 through the internal wire 64 (which is provided on each portion of the multilayer printed circuit board 53 of the rotor 51 in the form of a printed wire or the like). Meanwhile, the primary coil 58B of the transformer 47B is electrically connected to the rotor side coil pattern 32 of the rotor 51 through the internal wire 64. In addition, an input end of an amplifier circuit 65 is electrically connected to the secondary coil 48A of the transformer 47A through the internal wire 44 and an input end of an amplifier circuit 66 is electrically connected to the secondary coil 48B of the transformer 47B through the internal wire 44. The amplifier circuits 65 and 66 are provided in the multilayer printed circuit board 43 of the stator 41. Output ends of the amplifier circuits 65 and 66 are electrically connected to the scale control device 61 through the external wires 45.

Accordingly, in the case of the circuit configuration shown in FIG. 6, when the alternating current having the frequency f is supplied from the alternating current source 62 to the stator side coil pattern 33 of the stator 41, an induced voltage (a voltage having the frequency $f$ is generated on the rotor side coil pattern 31. The induced voltage varies periodically (where a period=one pitch Pm of the rotor side coil pattern 31) with a rotation angle of the rotor 51 (the rotor side coil pattern 31) (i.e. with variation in the degree of electromagnetic coupling corresponding to variation in a positional correlation between the stator side coil pattern 33 and the rotor side coil pattern 31). This induced voltage is transmitted from the rotating side (the rotor side) to the fixed side (the stator side) through the transformer 47A incorporated respectively in the rotating side and the fixed side. Thereafter, the induced voltage transmitted to the fixed side is amplified by the amplifier circuit 65 and is then inputted to the scale control device 61.

On the other hand, when the alternating current having the frequency f is supplied from the alternating current source 63 to the stator side coil pattern 34 of the stator 41, an induced voltage (a voltage having the frequency $f$ is generated on the rotor side coil pattern 32. The induced voltage varies periodically (in which a period=one pitch Ps of the rotor side coil pattern 32) with a rotation angle of the rotor 51 (the rotor side coil pattern 32) (i.e. with variation in the degree of electromagnetic coupling corresponding to variation in a positional correlation between the stator side coil pattern 34 and the rotor side coil pattern 32). This induced voltage is transmitted from the rotating side (the rotor side) to the fixed side (the stator side) through the transformer 47B incorporated respectively in the rotating side and the fixed side. Thereafter, the induced voltage transmitted to the fixed side is amplified by the amplifier circuit 66 and is then inputted to the scale control device 61. The scale control device 61 calculates an absolute value of a rotation angle (an absolute angle) of the rotor 51 (such as the rotating shaft of the machine tool or the like joined to the rotor 51) based on the induced voltages inputted from the amplifier circuits 65 and 66, as will be described later in detail.

Next, the circuit configuration in FIG. 7 will be described. As shown in the drawing, a scale control device 71, serving as a calculating means as well as a feeding means, includes two alternating current sources 72 and 73. The alternating current source 72 is electrically connected to the stator side coil pattern 33 of the stator 41 through the external wire 45 and the internal wire 44, and is configured to supply an alternating current having a frequency fm to this stator side coil pattern 33. Meanwhile, the other alternating current source 73 is electrically connected to the stator side coil pattern 34 of the stator 41 through the external wire 45 and the internal wire 44, and is configured to supply an alternating current having a frequency fs to this stator side coil pattern 34. Specifically, the scale control device 71 supplies the alternating currents provided with the different frequencies fm and fs respectively to the stator side coil patterns 33 and 34 of the stator 41. Moreover, the scale control device 71 supplies the alternating currents to each of the stator side coil patterns 33 and 34 of the stator 41 at different timings. Specifically, the electric supply from the alternating current source 72 to the stator side coil pattern 33, and the electric supply from the alternating current source 73 to the stator side coil pattern 34 are executed not simultaneously but at shifted timings.

An input end of a filter 74 is electrically connected to the rotor side coil pattern 31 of the rotor 51 through the internal wire 64 (which is provided on each portion of the multilayer printed circuit board 53 of the rotor 51 in the form of a printed wire or the like), and an input end of a filter 75 is electrically connected to the rotor side coil pattern 32 of the rotor 51 through the internal wire 64. The primary coil 58A of the transformer 47A is electrically connected to an output end of the filter 74 through the internal wire 64, and the primary coil 58B of the transformer 47B is electrically connected to an output end of the filter 75 through the internal wire 64. Each of the filters 74 and 75 are provided in the multilayer printed circuit board 53 of the rotor 51. The filter 74 cuts off the voltage having the frequency fs, while the other filter 75 cuts off the voltage having the frequency fm.

Meanwhile, the input end of the amplifier circuit 65 is electrically connected to the secondary coil 48A of the transformer 47A through the internal wire 44, and the input end of the amplifier circuit 66 is electrically connected to the secondary coil 48B of the transformer 47B through the internal wire 44. The amplifier circuits 65 and 66 are provided in the multilayer printed circuit board 43 of the stator 41. The output ends of the amplifier circuits 65 and 66 are electrically connected to the scale control device 71 through the external wires 45.

Accordingly, in the case of the circuit configuration shown in FIG. 7, when the alternating current having the frequency fm is supplied from the alternating current source 72 to the stator side coil pattern 33 of the stator 41, the induced voltage (the voltage having the frequency fm) is generated on the rotor side coil pattern 31. The induced voltage varies periodically (where the period=one pitch Pm of the rotor side coil pattern 31) with the rotation angle of the rotor 51 (the rotor side coil pattern 31) (i.e. with variation in the degree of electromagnetic coupling corresponding to variation in the positional correlation between the stator side coil pattern 33 and the rotor side coil pattern 31). This induced voltage is transmitted from the rotating side (the rotor side) to the fixed side (the stator side) through the transformer 47A incorporated in the rotating side and the fixed side. At this time, the filter 74 is configured to cut off the voltage having the frequency fs, i.e. to cut off the voltage having the frequency different from the frequency fm of the original induced voltage in the rotor side coil pattern 31. Accordingly, the original induced voltage having the frequency fm, which is generated by the electromagnetic coupling between the stator side coil pattern 33 and the rotor side coil pattern 31, is not cut off but is passed through the filter 74 to be transmitted to the fixed side. Thereafter, the induced voltage transmitted to the fixed side is amplified by the amplifier circuit 65 and is then inputted to the scale control device 71.

On the other hand, when the alternating current having the frequency fs is supplied from the alternating current source 73 to the stator side coil pattern 34 of the stator 41, the induced voltage (the voltage having the frequency fs) is generated on the rotor side coil pattern 32. The induced voltage varies periodically (where a period=one pitch Ps of the rotor side coil pattern 32) with the rotation angle of the rotor 51 (the rotor side coil pattern 32) (i.e. with variation in the degree of electromagnetic coupling corresponding to variation in the positional correlation between the stator side coil pattern 34 and the rotor side coil pattern 32). This induced voltage is transmitted from the rotating side (the rotor side) to the fixed side (the stator side) through the transformer 47B incorporated in the rotating side and the fixed side. At this time, the filter 75 is configured to cut off the voltage having the frequency fm, i.e. to cut off the voltage having the frequency different from the frequency fs of the original induced voltage in the rotor side coil pattern 32. Accordingly, the original induced voltage having the frequency fs, which is generated by the electromagnetic coupling between the stator side coil pattern 34 and the rotor side coil pattern 32, is not cut off but is passed through the filter 75 to be transmitted to the fixed side. Thereafter, the induced voltage transmitted to the fixed side is amplified by the amplifier circuit 66 and is then inputted to the scale control device 71. The scale control device 71 calculates the absolute value of the rotation angle (the absolute angle) of the rotor 51 (such as the rotating shaft of the machine tool or the like joined to the rotor 51) based on the induced voltages inputted from the amplifier circuits 65 and 66, as will be described later in detail.

Now, the contents of the process for calculating the absolute angle by use of the scale control device 61 or 71 will be described with reference to FIGS. 8 to 13. Contents of the process for calculating the absolute angle are the same for the scale control devices 61 and 71. Note that values Om, Os, D, E, and Z calculated in the calculating process are illustrated in a superposed manner in FIG. 8. Meanwhile, in order to clearly illustrate variations of the values Om, Os, D, E, and Z, the values are illustrated individually in FIGS. 9 to 13.

FIGS. 8 to 13 show an example where the pitch Pm of the rotor side coil pattern 31 is set to 72 [degrees] and the pitch Ps of the rotor side coil pattern 32 is set to 60 [degrees]. Throughout FIGS. 8 to 13, the lateral axis indicates the rotation angle (the absolute angle) of the rotor 51 and the longitudinal axis indicates the values Om, Os, D, E, and Z relative to the rotation angle (the absolute angle).

Throughout FIGS. 8 to 13, the value Om indicated with a solid line is the rotation angle of the rotor 51 detected by the rotor side coil pattern 31 having the pitch Pm, and the value Os indicated with a dashed line is the rotation angle of the rotor 51 detected by the rotor side coil pattern 32 having the pitch Ps. Specifically, the scale control device 61 or 71 firstly finds the detected angle Om based on the induced voltage of the rotor side coil pattern 31 and then finds the detected angle Os based on the induced voltage of the rotor side coil pattern 32. Since the pitch Pm is set to 72 [degrees] in the illustrated example, the detected angle Om varies iteratively at a period of 72 [degrees] and forms a saw-tooth shape as shown in the drawing. Meanwhile, since the pitch Ps is set to 60 [degrees], the detected angle Os varies iteratively at a period of 60 [degrees] and forms a saw-tooth shape as shown in the drawing.

Figure 8:
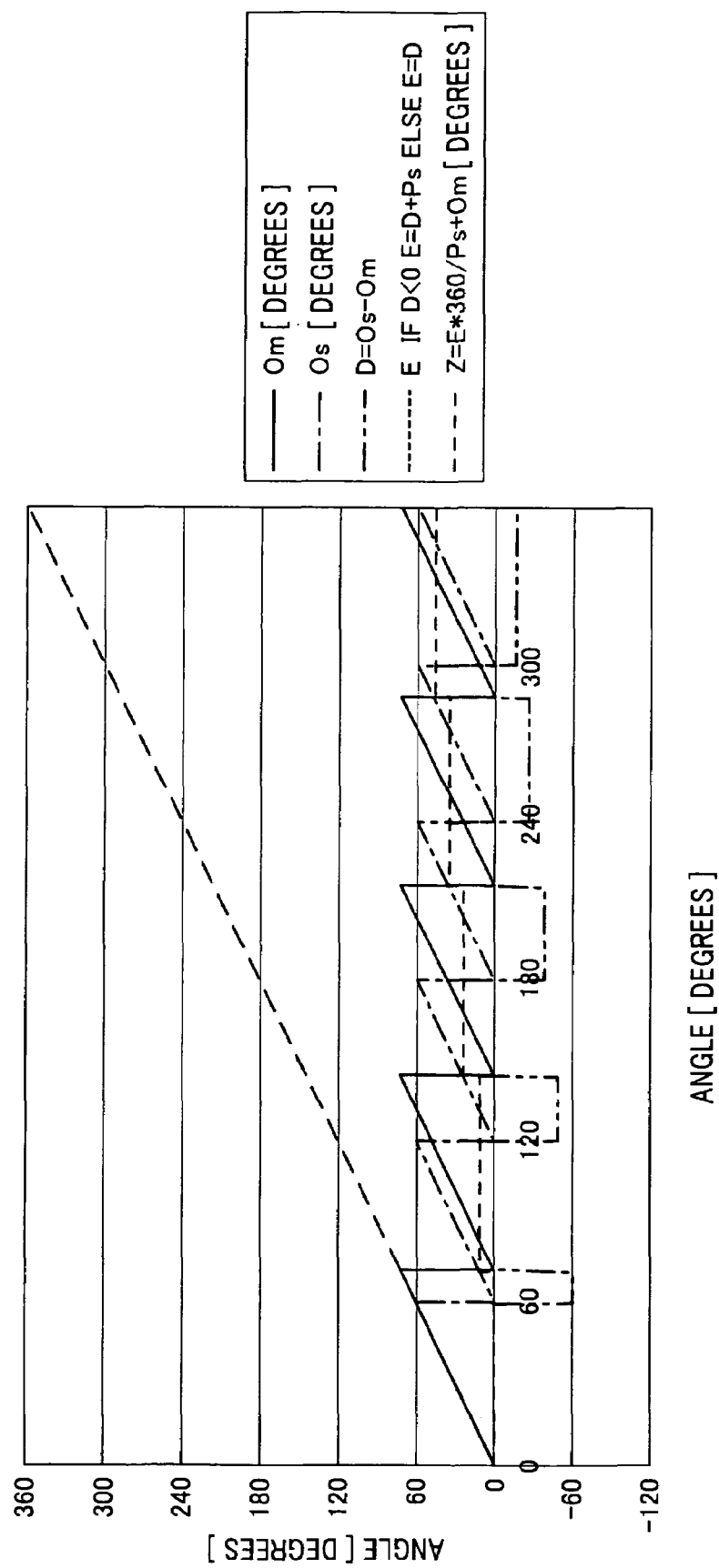
FIG. 8 is a graph for explaining contents of a process for calculating an absolute angle by use of a scale control device of the rotary absolute value scale.
Figure 9:
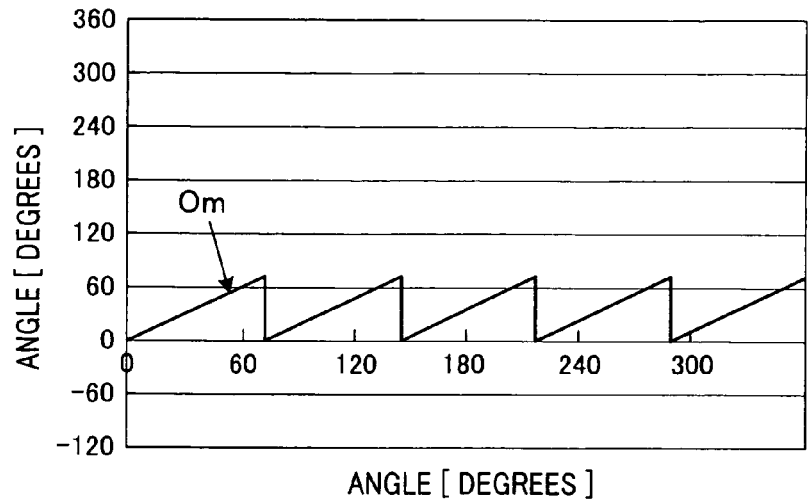
FIG. 9 is another graph for explaining the contents of the process for calculating the absolute angle by use of the scale control device of the rotary absolute value scale.
Figure 10:
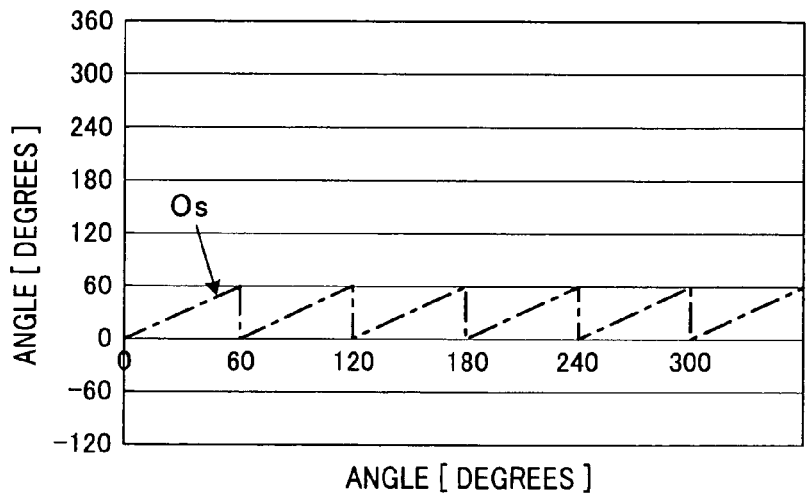
FIG. 10 is another graph for explaining the contents of the process for calculating the absolute angle by use of the scale control device of the rotary absolute value scale.
Figure 11:
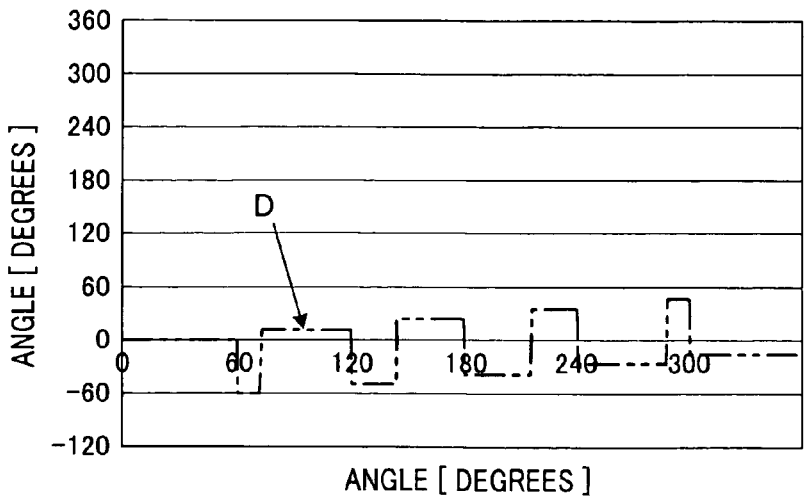
FIG. 11 is another graph for explaining the contents of the process for calculating the absolute angle by use of the scale control device of the rotary absolute value scale.
Figure 12:
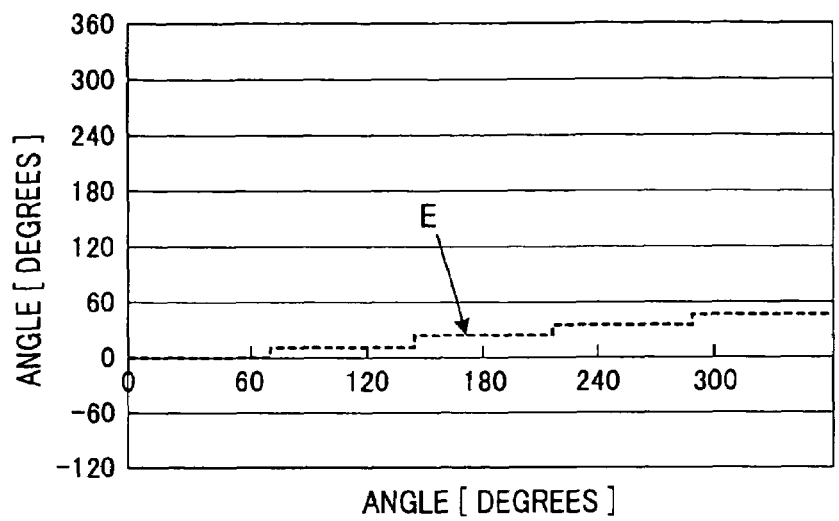
FIG. 12 is another graph for explaining the contents of the process for calculating the absolute angle by use of the scale control device of the rotary absolute value scale.
Figure 13:
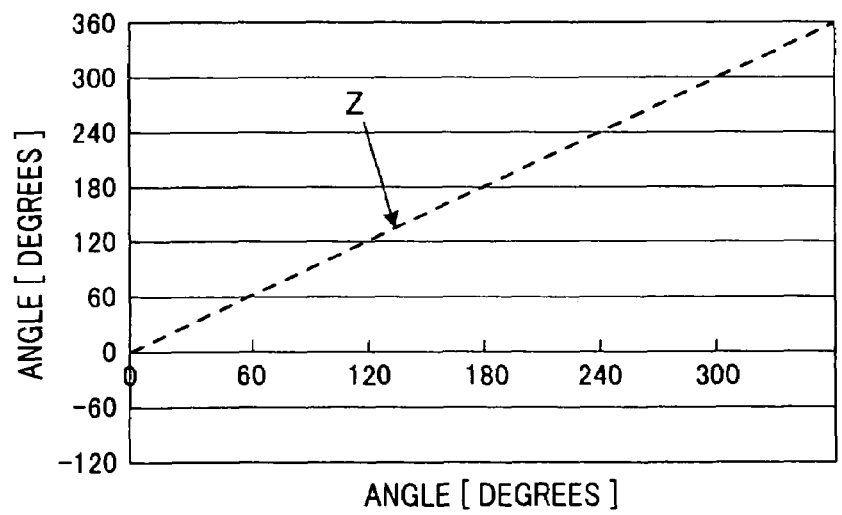
FIG. 13 is another graph for explaining the contents of the process for calculating the absolute angle by use of the scale control device of the rotary absolute value scale.

Here, as shown in FIGS. 8 to 10, positional relations between the rotor side coil patterns 31 and 32 and the stator side coil patterns 33 and 34 are set such that both of the detected angles Om and Os become equal to 0 [degrees] when the rotation angle (the absolute angle) of the rotor 51 is equal to 0 [degrees]. However, there may be a case where the detected angles Om and Os do not become equal to 0 [degrees] as designed when the rotation angle (the absolute angle) of the rotor 51 is equal to 0 [degrees], and some deviation is generated in the detected angles Om and Os. Such deviation may be attributable to rotational deviation of the rotor 51 relative to the stator 41 based on manufacturing variation of the rotary absolute value scale, for example. Accordingly, deviation amounts (an offset amount) for these detected angles Om and Os are obtained in advance by an experiment and are set in (inputted to and stored in) the scale control device 61 or 71. Then, according to the deviation amounts (the offset amount), the scale control device 61 or 71 corrects the detected angles Om and Os derived from the induced voltages. Specifically, the scale control device 61 or 71 corrects (offsets) so as to adjust both of the detected angles Om and Os to be equal to 0 [degrees] when the rotation angle (the absolute angle) of the rotor 51 is equal to 0 [degrees], by either adding or subtracting the deviation amounts (the offset amount) to or from the detected angles Om and Os derived from the induced voltages.

Moreover, a relation between the pitch Pm and the pitch Ps needs to satisfy the following formulae (1) and (2). The formula (2) is a modified form of the formula (1). Specifically, in a range of 360 [degrees], the number of pitches of the rotor side coil pattern 32 having the pitch Ps is set one pitch larger than the number of pitches of the rotor side coil pattern 31 having the pitch Pm. Naturally, the case of setting the pitch Pm equal to 72 [degrees] and the pitch Ps equal to 60 [degrees] satisfies the formulae (1) and (2). Accordingly, as can be seen in FIGS. 8 to 10, the number of iterated variation in the saw-tooth shape of the detected angle Os for a period of rotation of the rotor 51 by 360 [degrees] is one count greater than the number of iterated variation in the saw-tooth shape of the detected angle Om:

$$360/Pm-1=360/Ps \quad (1)$$

$$Ps=360/((360/Pm)+1) \quad (2)$$

Next, the scale control device 61 or 71 finds a difference D between the detected angles Os and Om, by calculating the following formula (3) on the basis of the detected angles Om and Os:

$$D=Os-Om \quad (3)$$

Subsequently, the scale control device 61 or 71 judges whether the value D found by the formula (3) is positive or negative. If the value D is negative (D<0), the scale control device 61 or 71 finds a value E based on the following formula (4). That is, a value obtained by adding the pitch Ps to the value D is defined as the value E. On the contrary, if the value D is nonnegative (D≧0), the scale control device 61 or 71 finds the value E based on the following formula (5). Specifically, the value D found by the formula (3) is defined as the value E without change:

$$E=D+Ps \quad (4)$$

$$E=D \quad (5)$$

Then, the scale control device 61 or 71 finds an absolute angle Z of the rotor 51 by calculating the following formula (6), on the basis of the value E set by use of the formula (4) or (5), the pitch Ps, and the detected angle Om:

$$Z=E\times 360/Ps+Om \quad (6)$$

Cited below are examples of calculation of the absolute angle Z according to the illustrated example.

(1) When the absolute angle of the rotor 51 is equal to 0 [degrees], both of the detected angles Om and Os become equal to 0 [degrees], the value D becomes equal to 0, and the value E becomes equal to 0. Accordingly, the calculated value of the absolute angle Z also becomes equal to 0 [degrees].

(2) When the absolute angle of the rotor 51 is equal to 30 [degrees], both of the detected angles Om and Os become equal to 30 [degrees], the value D becomes equal to 0, and the value E becomes equal to 0. Accordingly, the calculated value of the absolute angle Z also becomes equal to 30 [degrees].

(3) When the absolute angle of the rotor 51 is equal to 60 [degrees], the detected angle Om becomes equal to 60 [degrees], the detected angle Os becomes equal to 0 [degrees], the value D becomes equal to −60, and the value E becomes equal to 0. Accordingly, the calculated value of the absolute angle Z also becomes equal to 60 [degrees].

(4) When the absolute angle of the rotor 51 is equal to 65 [degrees], the detected angle Om becomes equal to 65 [degrees], the detected angle Os becomes equal to 5 [degrees], the value D becomes equal to −60, and the value E becomes equal to 0. Accordingly, the calculated value of the absolute angle Z also becomes equal to 65 [degrees].

(5) When the absolute angle of the rotor 51 is equal to 72 [degrees], the detected angle Om becomes equal to 0 [degrees], the detected angle Os becomes equal to 12 [degrees], the value D becomes equal to 12, and the value E becomes equal to 12. Accordingly, the calculated value of the absolute angle Z also becomes equal to 72 [degrees].

(6) When the absolute angle of the rotor 51 is equal to 90 [degrees], the detected angle Om becomes equal to 18 [degrees], the detected angle Os becomes equal to 30 [degrees], the value D becomes equal to 12, and the value E becomes equal to 12. Accordingly, the calculated value of the absolute angle Z also becomes equal to 90 [degrees].

(7) When the absolute angle of the rotor 51 is equal to 120 [degrees], the detected angle Om becomes equal to 48 [degrees], the detected angle Os becomes equal to 0 [degrees], the value D becomes equal to −48, and the value E becomes equal to 12. Accordingly, the calculated value of the absolute angle Z also becomes equal to 120 [degrees].

(8) When the absolute angle of the rotor 51 is equal to 130 [degrees], the detected angle Om becomes equal to 58 [degrees], the detected angle Os becomes equal to 10 [degrees], the value D becomes equal to −48, and the value E becomes equal to 12. Accordingly, the calculated value of the absolute angle Z also becomes equal to 130 [degrees].

(9) When the absolute angle of the rotor 51 is equal to 144 [degrees], the detected angle Om becomes equal to 0 [degrees], the detected angle Os becomes equal to 24 [degrees], the value D becomes equal to 24, and the value E becomes equal to 24. Accordingly, the calculated value of the absolute angle Z also becomes equal to 144 [degrees].

(10) When the absolute angle of the rotor 51 is equal to 150 [degrees], the detected angle Om becomes equal to 6 [degrees], the detected angle Os becomes equal to 30 [degrees], the value D becomes equal to 24, and the value E becomes equal to 24. Accordingly, the calculated value of the absolute angle Z also becomes equal to 150 [degrees].

As described above, according to the rotary absolute value scale of the first embodiment, the two rotor side coil patterns 31 and 32 are laminated and the two stator side coil patterns 33 and 34 are also laminated. Accordingly, unlike the conventional case of providing two coil patterns in the same plane, it is possible to increase space occupied by each of the coil patterns 31, 32, 33, and 34 (lengths in a radial direction of each of the coil patterns 31, 32, 33, and 34) without increasing the size of the entire rotary absolute value scale. As a consequence, it is possible to reduce an adverse effect attributable to manufacturing variation of the rotary absolute value scale, and detection accuracy of the absolute angle of the rotor 51 is thereby stabilized.

Meanwhile, according to the rotary absolute value scale of the first embodiment, the rotor 51 is formed by providing the two rotor side coil patterns 31 and 32 respectively on the layers of the multilayer printed circuit board 53 in the form of printed wires. In the meantime, the stator 41 is formed by providing the two stator side coil patterns 33 and 34 respectively on the layers of the multilayer printed circuit board 43 in the form of printed wires. As a consequence, pattern accuracy and positioning accuracy of the coil patterns 31, 32, 33, and 34 can be achieved easily, and the laminated structures of the coil patterns 31, 32, 33, and 34 can be realized easily. In addition, since the internal wires 44 and 64 can also be provided easily in the form of printed wires, the conventional cumbersome processes for providing wiring grooves on the base material are no longer required.

Meanwhile, according to the rotary absolute value scale of the first embodiment, the rotary absolute value scale includes the scale control device 61 (namely, the alternating current sources 62 and 63) for supplying the alternating currents to each of the stator side coil patterns 33 and 34 of the stator 41 at different timings. Accordingly, even with the structure formed by laminating the two rotor side coil patterns 31 and 32 and laminating the two stator side coil patterns 33 and 34, it is possible to ensure detection accuracy of the absolute angle of the rotor 51 while reducing electromagnetic interferences between these layers.

In addition, according to the rotary absolute value scale of the first embodiment, the rotary absolute value scale includes: the scale control device 71 (namely, the alternating current sources 72 and 73) for supplying alternating currents of different frequencies fm and fs respectively to stator side coil patterns 33 and 34 of the stator 41; and the filters 74 and 75 respectively provided on the output ends of the rotor side coil patterns 31 and 32 of the rotor 51, configured to cut off the voltage having the frequency different from the frequency fm or fs of the original induced voltage in each of the rotor side coil patterns 31 and 32. Accordingly, even with the structure formed by laminating the two rotor side coil patterns 31 and 32 and laminating the two stator side coil patterns 33 and 34, it is possible to ensure detection accuracy of the absolute angle of the rotor 51 while reducing electromagnetic interferences between these layers.

Moreover, according to the rotary absolute value scale of the first embodiment, the scale control device 71 (namely, the alternating current sources 72 and 73) supplies the alternating currents to each of the stator side coil patterns 33 and 34 of the stator 41 at different timings. Accordingly, it is possible to ensure detection accuracy of the absolute angle of the rotor 51 more reliably while reducing electromagnetic interferences between these layers. If the alternating currents are supplied to the stator side coil patterns 33 and 34 simultaneously, an electromagnetic interference may occur between the transformers 47A and 47B, for example. However, such an electromagnetic interference can be avoided by supplying the alternating currents to the stator side coil patterns 33 and 34 at different timings.

Furthermore, according to the rotary absolute value scale of the first embodiment, the absolute angle of the rotor 51 can be calculated easily and reliably since the relation between the pitch Pm of the rotor side coil pattern 31 and the pitch Ps of the rotor side coil pattern 32 is set to satisfy Ps=360/((360/Pm)+1), and the positional relation between the rotor side coil patterns 31 and 32 and the stator side coil patterns 33 and 34 are set such that both of the detected angle Om found on the basis of the induced voltage of the rotor side coil pattern 31 and the detected angle Os found on the basis of the induced voltage of the rotor side coil pattern 32 become equal to 0° when the absolute angle of the rotor 51 is equal to 0°. Moreover, the rotary absolute value scale includes the scale control device 61 or 71 that calculates the absolute angle Z of the rotor 51 in the following manner. Specifically, the detected angle Om is found on the basis of the induced voltage of the rotor side coil pattern 31, the detected angle Os is found on the basis of the induced voltage of the rotor side coil pattern 32, and the value D is found on the basis of formula D=Os−Om. Subsequently, the value E is found on the basis of formula E=D+Ps when the value D is a negative value, and the value E is found on the basis of formula E=D when the value D is a nonnegative value. Finally, the absolute angle Z of the rotor 51 is found on the basis of formula Z=E×360/Ps+Om.

In addition, according to the rotary absolute value scale of the first embodiment, the scale control device 61 or 71 corrects both of the detected angles Om and Os to become equal to 0° when the absolute angle of the rotor 51 is equal to 0°, according to the deviation amounts of the detected angles Om and Os from 0° obtained by a preliminary experiment when the absolute angle of the rotor 51 is equal to 0°. Accordingly, even if the rotary absolute value scale contains manufacturing variation, it is possible to ensure detection accuracy of the absolute angle of the rotor 51.

Second Embodiment

Figure 14:
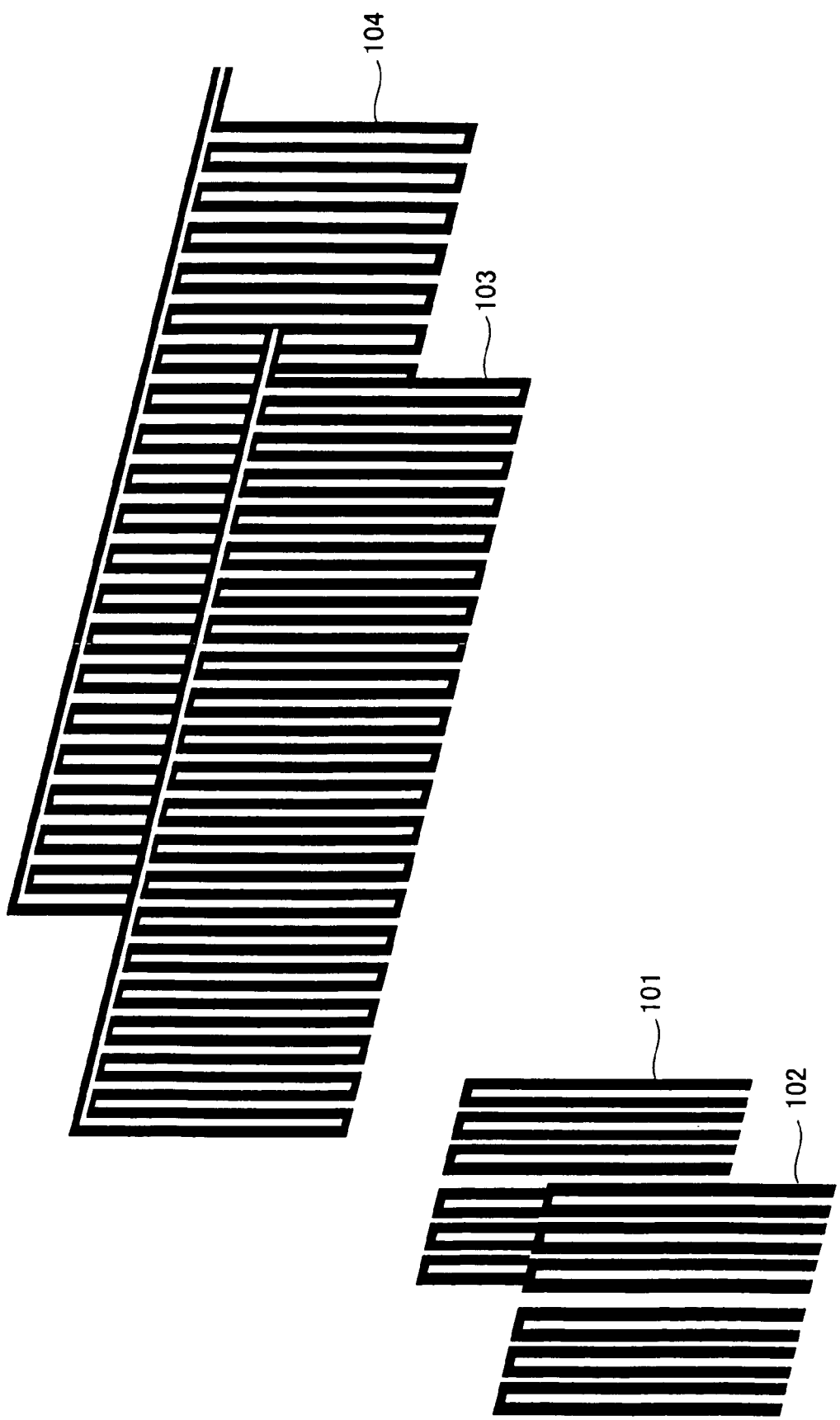
FIG. 14 is a perspective view of slider side coil patterns and scale side coil patterns of a linear absolute value scale according to a second embodiment of the present invention.
Figure 15A:
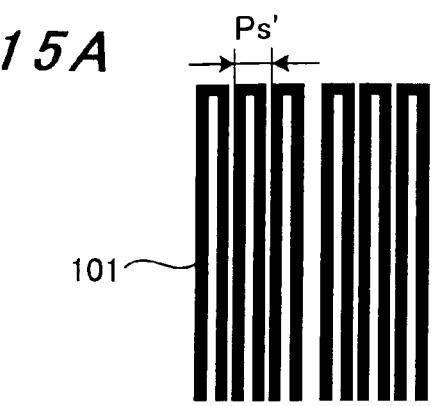
FIGS. 15A to 15D are front views of the slider side coil patterns and the scale side coil patterns.
Figure 15B:
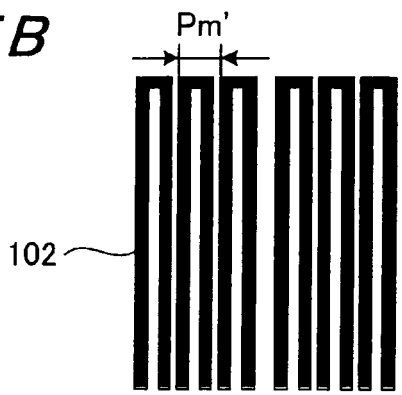
Figure 15C:
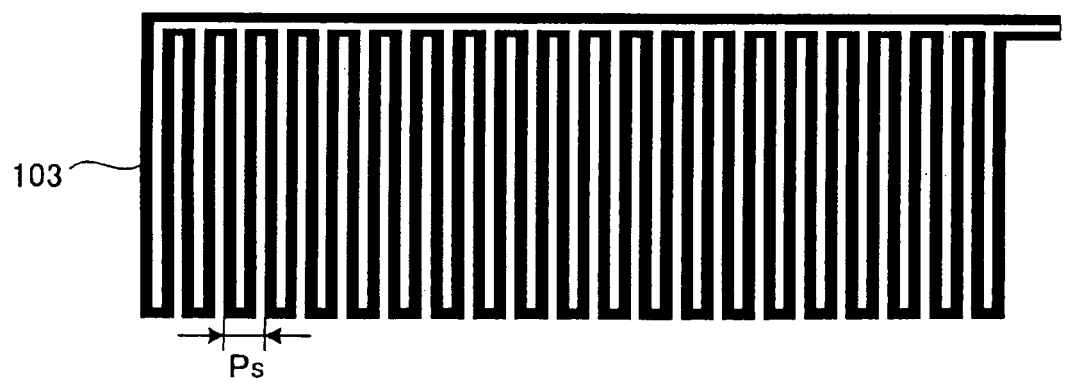
Figure 15D:
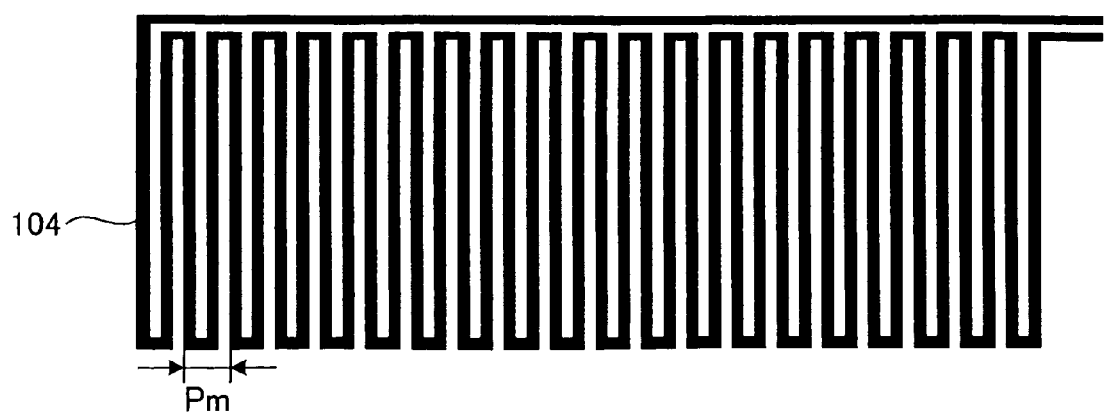
Figure 16A:
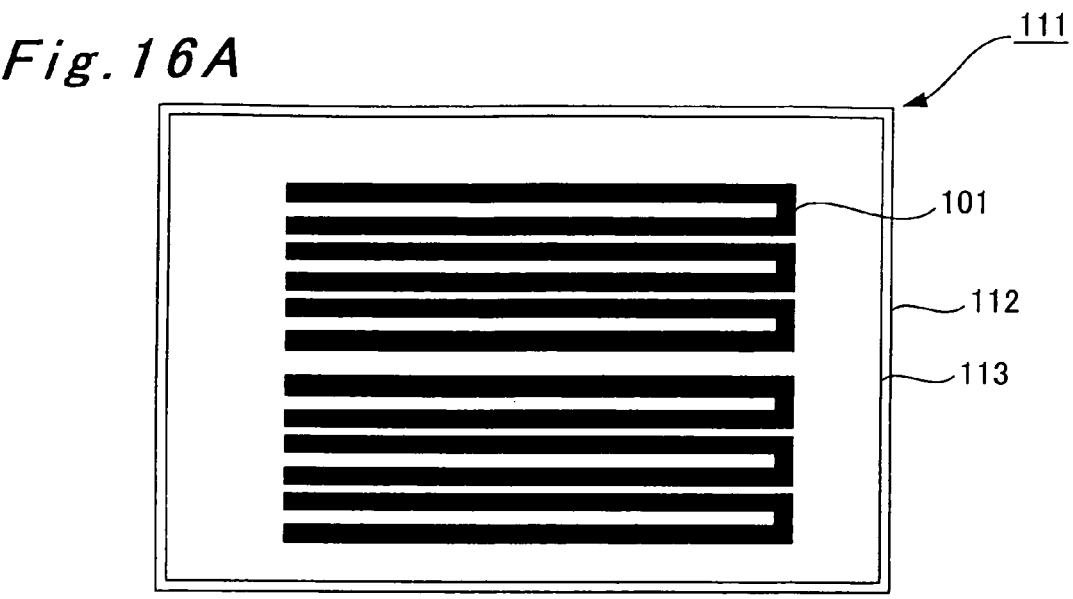
FIG. 16A is a front view of a slider constituting the linear absolute value scale and FIG. 16B is a sectional side view of the slider constituting the linear absolute value scale.
Figure 16B:
Figure 17A:
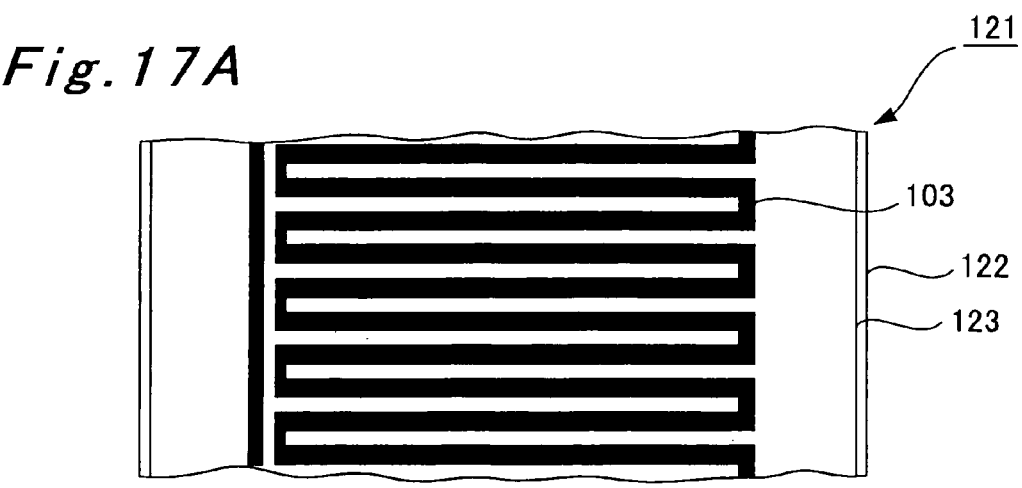
FIG. 17A is a front view of a scale constituting the linear absolute value scale and FIG. 17B is a sectional side view of the scale constituting the linear absolute value scale.
Figure 17B:
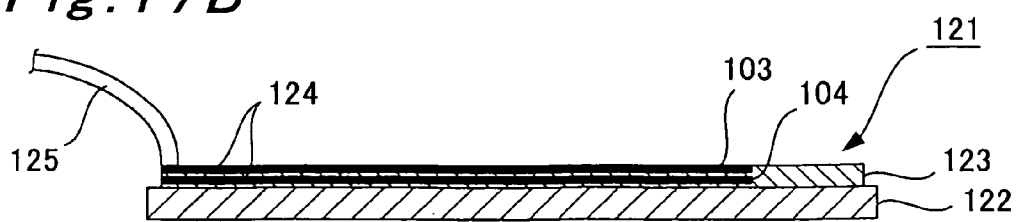
Figure 18:
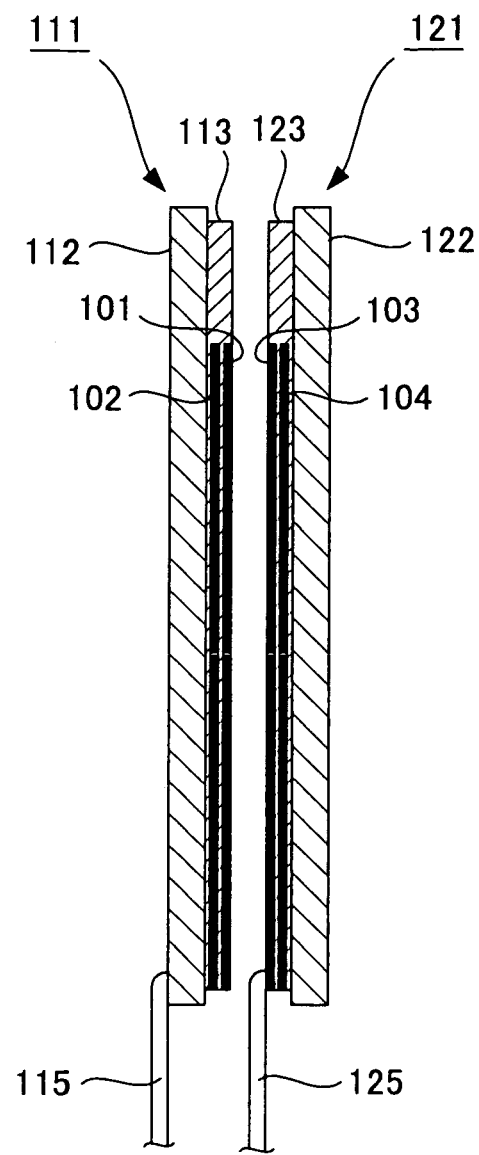
FIG. 18 is a sectional side view showing an overall configuration of the linear absolute value scale.
Figure 19:
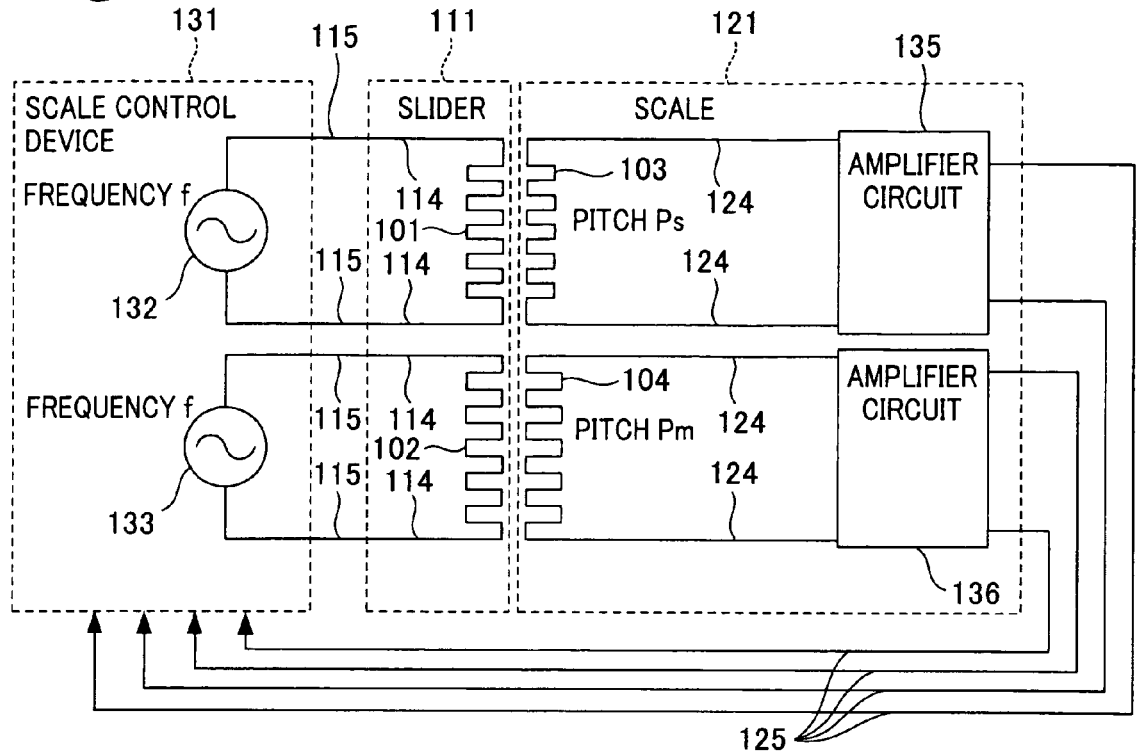
FIG. 19 is a diagram showing a circuit configuration of the linear absolute value scale.
Figure 20:
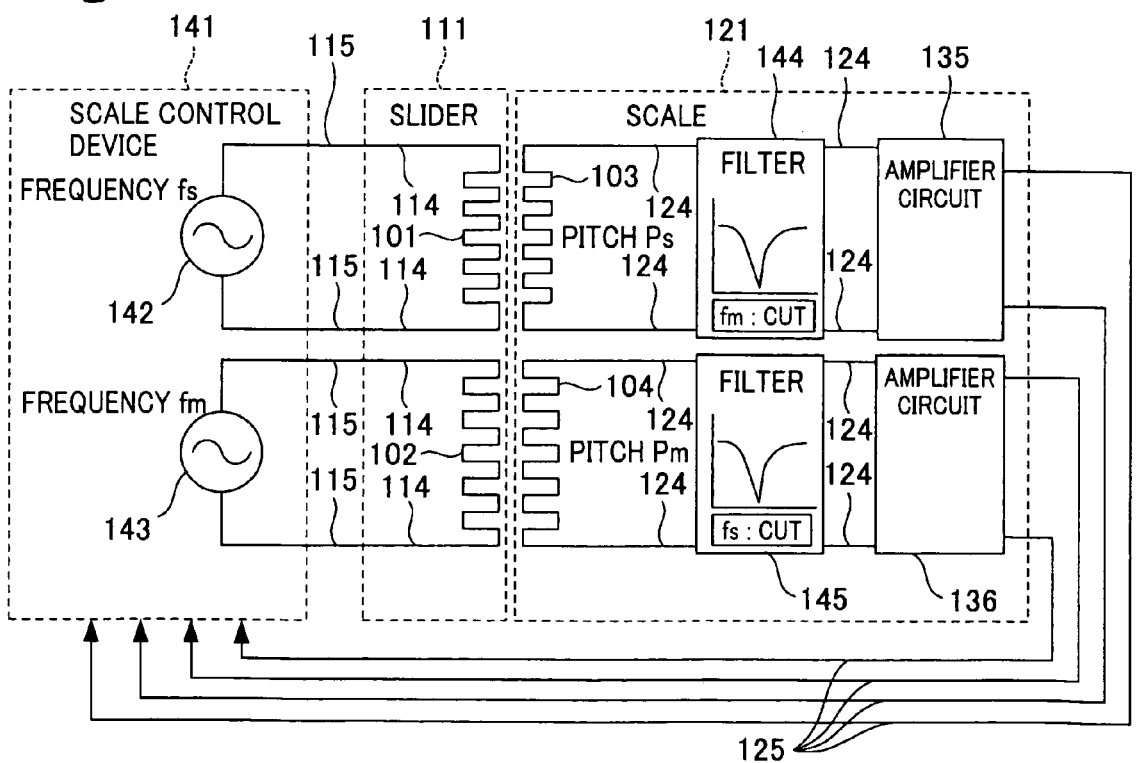
FIG. 20 is a diagram showing another circuit configuration of the linear absolute value scale.

FIG. 14 is a perspective view of slider side coil patterns and scale side coil patterns of a linear absolute value scale according to a second embodiment of the present invention. FIGS. 15A to 15D are front views of the slider side coil patterns and the scale side coil patterns. FIG. 16A is a front view and FIG. 16B is a sectional side view of a slider constituting the linear absolute value scale. FIG. 17A is a front view and FIG. 17B is a sectional side view of a scale constituting the linear absolute value scale. FIG. 18 is a sectional side view showing an overall configuration of the linear absolute value scale. FIG. 19 is a diagram showing a circuit configuration of the linear absolute value scale. FIG. 20 is a diagram showing another circuit configuration of the linear absolute value scale. FIGS. 21 to 26 are graphs for explaining contents of a process for calculating an absolute value of displacement by use of a scale control device of the linear absolute value scale.

The linear absolute value scale of the second embodiment is an absolute value scale applying an inductosyn type linear scale capable of detecting an absolute value of an amount of displacement (an absolute value of displacement). The linear absolute value scale is configured of: a slider on a sliding side having a slider side coil pattern 101 (a second slider side coil pattern) and another slider side coil pattern 102 (a first slider side coil pattern) both of which are provided with different pitches, which are folded in a zigzag manner and formed into linear shapes on the whole as shown in FIGS. 14, 15A and 15B; and a scale on a fixed side having a scale side coil pattern 103 (a second scale side coil pattern) and another scale side coil pattern 104 (a first scale side coil pattern) both of which are provided with different pitches, which are folded in a zigzag manner and formed into linear shapes on the whole as shown in FIGS. 1, 15C and 15D. As shown in FIG. 14, the slider and the scale are disposed to face each other so that the slider side coil patterns 101 and 102 can face the scale side coil patterns 103 and 104.

As shown in FIGS. 15A to 15D, the two scale side coil patterns 103 and 104 are provided with different pitches Ps [mm] and Pm [mm] (where Ps<Pm), respectively, and the two slider side coil patterns 101 and 102 are also provided with different pitches Ps' [mm] and Pm' [mm] (where Ps'<Pm'), respectively, corresponding to the pitches Ps and Pm of the scale side coil patterns 103 and 104.

Moreover, in the second embodiment, the two slider side coil patterns 101 and 102 are laminated so as to be provided in different planes as shown in FIG. 14, instead of being provided in the same plane as in the conventional technique. In addition, the two scale side coil patterns 103 and 104 are also laminated so as to be provided in different planes as shown in FIG. 14, instead of being provided in the same plane as in the conventional technique.

Now, configurations of the slider and the scale will be described further in detail with reference to FIGS. 16 to 18.

As shown in FIGS. 16A and 16B, a slider 111 of this linear absolute value scale is formed by fixing, by use of fixing means such as an adhesive, a multilayer printed circuit board 113 onto a surface of a base member 112 for ensuring strength. Moreover, the slider side coil pattern 101 and the slider side coil pattern 102 are respectively printed on a first layer (a surface layer) and a second layer (an inner layer) of the multilayer printed circuit board 113, and the two layers are laminated. Meanwhile, internal wires 114 are also printed on the layers of the multilayer printed circuit board 113, and the slider side coil patterns 101 and 102 are electrically connected to external wires 115 through these internal wires 114. The external wires 115 are electrically connected to a scale control device (see FIGS. 19 and 20; to be described later in detail).

As shown in FIGS. 17A and 17B, a scale 121 of this linear absolute value scale is formed by fixing, by use of fixing means such as an adhesive, a multilayer printed circuit board 123 onto a surface of a base member 122 for ensuring strength. Moreover, the scale side coil pattern 103 and the scale side coil pattern 104 are respectively printed on a first layer (a surface layer) and a second layer (an inner layer) of the multilayer printed circuit board 123, and the two layers are laminated. Meanwhile, internal wires 124 are also printed on the layers of the multilayer printed circuit board 123, and the scale side coil patterns 103 and 104 are electrically connected to external wires 125 through these internal wires 124. The external wires 125 are electrically connected to the scale control device (see FIGS. 19 and 20; to be described later in detail).

As shown in FIG. 18, the slider 111 and the scale 121 are disposed to face each other so that the slider side coil patterns 101 and 102 can face the scale side coil patterns 103 and 104. The slider 111 is fitted to a linear motion shaft of a machine tool or the like and moves (slides) linearly in an orthogonal direction to a sheet face of FIG. 18 together with the linear motion shaft. Meanwhile, the scale 121 is fitted to a fixed part of the machine tool or the like.

Next, circuit configurations of the linear absolute value scale will be described with reference to FIGS. 19 and 20. The linear absolute value scale may employ any of circuit configurations shown in FIGS. 19 and 20.

First, the circuit configuration in FIG. 19 will be described. As shown in the drawing, a scale control device 131, serving as a calculating means as well as a feeding means, includes two alternating current sources 132 and 133. The alternating current source 132 is electrically connected to the slider side coil pattern 101 of the slider 111 through the external wire 115 and the internal wire 114, and is configured to supply an alternating current having a frequency f to this slider side coil pattern 101. Meanwhile, the other alternating current source 133 is electrically connected to the slider side coil pattern 102 of the slider 111 through the external wire 115 and the internal wire 114, and is configured to supply an alternating current having a frequency f to this slider side coil pattern 102. Moreover, the scale control device 131 supplies the alternating currents to each of the slider side coil patterns 101 and 102 of the slider 111 at different timings. Specifically, the electric supply from the alternating current source 132 to the slider side coil pattern 101 and the electric supply from the alternating current source 133 to the slider side coil pattern 102 are executed not simultaneously but at shifted timings.

An input end of an amplifier circuit 135 is electrically connected to the scale side coil pattern 103 of the scale 121 through the internal wire 124, and an input end of an amplifier circuit 136 is electrically connected to the scale side coil pattern 104 of the scale 121 through the internal wire 124. The amplifier circuits 135 and 136 are provided in the multilayer printed circuit board 123 of the scale 121. Output ends of the amplifier circuits 135 and 136 are electrically connected to the scale control device 131 through the external wires 125.

Accordingly, in the case of the circuit configuration shown in FIG. 19, when the alternating current having the frequency f is supplied from the alternating current source 132 to the slider side coil pattern 101 of the slider 111, an induced voltage (a voltage having the frequency $f$ is generated on the scale side coil pattern 103. The induced voltage varies periodically (where a period=one pitch Ps of the scale side coil pattern 103) with an amount of linear displacement of the slider 111 (the slider side coil pattern 101) (i.e. with variation in the degree of electromagnetic coupling corresponding to variation in a positional correlation between the slider side coil pattern 101 and the scale side coil pattern 103). Thereafter, this induced voltage (the voltage having the frequency $f$ is amplified by the amplifier circuit 135 and is then inputted to the scale control device 131.

On the other hand, when the alternating current having the frequency f is supplied from the alternating current source 133 to the slider side coil pattern 102 of the slider 111, an induced voltage (a voltage having the frequency $f$ is generated on the scale side coil pattern 104. The induced voltage varies periodically (where a period=one pitch Pm of the scale side coil pattern 104) with an amount of linear displacement of the slider 111 (the slider side coil pattern 102) (i.e. with variation in the degree of electromagnetic coupling corresponding to variation in a positional correlation between the slider side coil pattern 102 and the scale side coil pattern 104). Thereafter, this induced voltage is amplified by the amplifier circuit 136 and is then inputted to the scale control device 131. The scale control device 131 calculates an absolute value of an amount of linear displacement (an absolute amount of displacement) of the slider 111 (such as the linear motion shaft of the machine tool or the like joined to the slider 111) based on the induced voltages inputted from the amplifier circuits 135 and 136, as will be described later in detail.

Next, the circuit configuration in FIG. 20 will be described. As shown in the drawing, a scale control device 141, serving as a calculating means as well as a feeding means, includes two alternating current sources 142 and 143. The alternating current source 142 is electrically connected to the slider side coil pattern 101 of the slider 111 through the external wire 115 and the internal wire 114, and is configured to supply an alternating current having a frequency fs to this slider side coil pattern 101. Meanwhile, the other alternating current source 143 is electrically connected to the slider side coil pattern 102 of the slider 111 through the external wire 115 and the internal wire 114, and is configured to supply an alternating current having a frequency fm to this slider side coil pattern 102. Specifically, the scale control device 141 supplies the alternating currents provided with the different frequencies fm and fs respectively to the slider side coil patterns 101 and 102 of the slider 111. Moreover, the scale control device 141 supplies the alternating currents to each of the slider side coil patterns 101 and 102 of the slider 111 at different timings. Specifically, the electric supply from the alternating current power unit 142 to the slider side coil pattern 101 and the electric supply from the alternating current 143 to the slider side coil pattern 102 are executed not simultaneously but at shifted timings.

An input end of a filter 144 is electrically connected to the scale side coil pattern 103 of the scale 121 through the internal wire 124, and an input end of a filter 145 is electrically connected to the scale side coil pattern 104 of the scale 121 through the internal wire 124. The filters 144 and 145 are provided in the multilayer printed circuit board 123 of the scale 121. The filter 144 cuts off the voltage having the frequency fm while the other filter 145 cuts off the voltage having the frequency fs.

Meanwhile, the input end of the amplifier circuit 135 is electrically connected to an output end of the filter 144 through the internal wire 124, and the input end of the amplifier circuit 136 is electrically connected to an output end of the filter 145 through the internal wire 124. The amplifier circuits 135 and 136 are provided in the multilayer printed circuit board 123 of the scale 121. The output ends of the amplifier circuits 135 and 136 are electrically connected to the scale control device 141 through the external wires 125.

Accordingly, in the case of the circuit configuration shown in FIG. 20, when the alternating current having the frequency fs is supplied from the alternating current source 142 to the slider side coil pattern 101 of the slider 111, the induced voltage (the voltage having the frequency fs) is generated on the scale side coil pattern 103. The induced voltage varies periodically (where a period=one pitch Ps of the scale side coil pattern 103) with the amount of linear displacement of the slider 111 (the slider side coil pattern 101) (i.e. with the variation in the degree of electromagnetic coupling corresponding to variation in the positional correlation between the slider side coil pattern 101 and the scale side coil pattern 103). This induced voltage is transmitted to the amplifier circuit 135 through the filter 144. At this time, the filter 144 is configured to cut off the voltage having the frequency fm, i.e. to cut off the voltage having the frequency different from the frequency fs of the original induced voltage in the scale side coil pattern 103. Accordingly, the original induced voltage having the frequency fs, which is generated by the electromagnetic coupling between the slider side coil pattern 101 and the scale side coil pattern 103, is not cut off but is passed through the filter 144 to be transmitted to the amplifier circuit 135. Thereafter, the induced voltage transmitted to the amplifier circuit 135 is amplified by the amplifier circuit 135 and is then inputted to the scale control device 141.

On the other hand, when the alternating current having the frequency fm is supplied from the alternating current source 143 to the slider side coil pattern 102 of the slider 111, the induced voltage (the voltage having the frequency fm) is generated on the scale side coil pattern 104. The induced voltage varies periodically (where a period=one pitch Pm of the scale side coil pattern 104) with the amount of linear displacement of the slider 111 (the slider side coil pattern 102) (i.e. with the variation in the degree of electromagnetic coupling corresponding to variation in the positional correlation between the slider side coil pattern 102 and the scale side coil pattern 104). This induced voltage is transmitted to the amplifier circuit 136 through the filter 145. At this time, the filter 145 is configured to cut off the voltage having the frequency fs, i.e. to cut off the voltage having the frequency different from the frequency fm of the original induced voltage in the scale side coil pattern 104. Accordingly, the original induced voltage having the frequency fm, which is generated by the electromagnetic coupling between the slider side coil pattern 102 and the scale side coil pattern 104, is not cut off but is passed through the filter 145 to be transmitted to the amplifier circuit 136. Thereafter, the induced voltage transmitted to the amplifier circuit 136 is amplified by the amplifier circuit 136 and is then inputted to the scale control device 141. The scale control device 141 calculates the absolute value of the amount of linear displacement (the absolute amount of displacement) of the slider 111 (such as the linear motion shaft of the machine tool or the like joined to the slider 111) based on the induced voltages inputted from the amplifier circuits 135 and 136, as will be described later in detail.

Now, the contents of the process for calculating the absolute amount of displacement by use of the scale control device 131 or 141 will be described with reference to FIGS. 21 to 26. Contents of the process for calculating the absolute amount of displacement are the same for the scale control devices 131 and 141. Note that values Om, Os, D, E, and Z calculated in the calculating process are illustrated in a superposed manner in FIG. 21. Meanwhile, in order to clearly illustrate variations of the values Om, Os, D, E, and Z, the values are illustrated individually in FIGS. 22 to 26.

FIGS. 21 to 26 show an example where a detected amount of displacement L of the entire linear absolute value scale is set to 360 [mm], the pitch Pm of the scale side coil pattern 104 is set to 72 [mm], and the pitch Ps of the scale side coil pattern 103 is set to 60 [mm]. Throughout FIGS. 21 to 26, the lateral axis indicates the absolute amount of linear displacement (the absolute amount of displacement) of the slider 111, and the longitudinal axis indicates the values Om, Os, D, E, and Z relative to the absolute amount of linear displacement (the absolute amount of displacement).

Throughout FIGS. 21 to 26, the value Om indicated with a solid line is the amount of displacement of the slider 111 detected by the scale side coil pattern 104 having the pitch Pm, and the value Os indicated with a dashed line is the amount of displacement of the slider 111 detected by the scale side coil pattern 103 having the pitch Ps. Specifically, the scale control device 131 or 141 firstly finds the detected amount of displacement Om based on the induced voltage of the scale side coil pattern 104, and then finds the detected angle Os based on the induced voltage of the scale side coil pattern 103. Since the pitch Pm is set to 72 [mm] in the illustrated example, the detected amount of displacement Om varies iteratively at a period of 72 [mm] and forms a saw-tooth shape as shown in the drawing. Meanwhile, since the pitch Ps is set to 60 [mm], the detected amount of displacement Os varies iteratively at a period of 60 [mm] and forms a saw-tooth shape as shown in the drawing.

Figure 21:
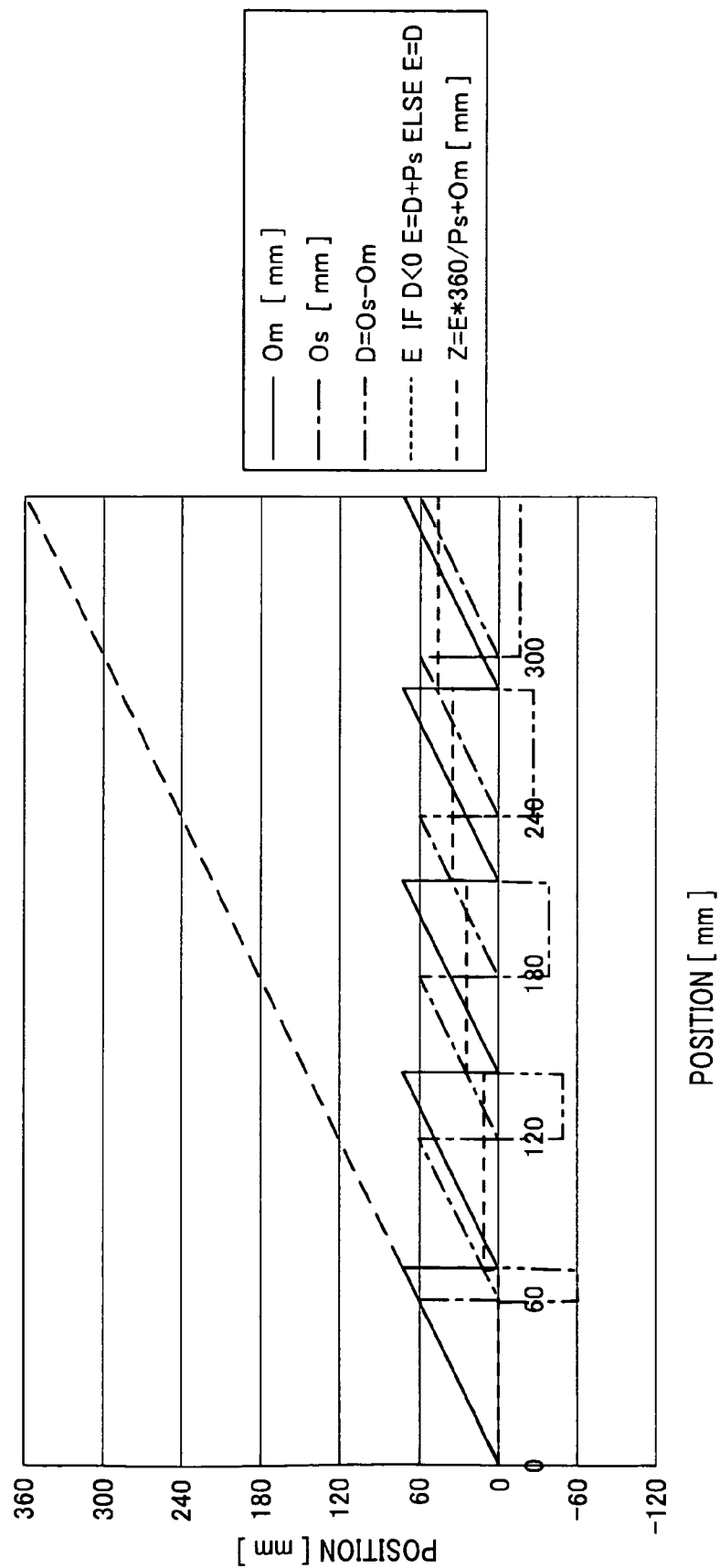
FIG. 21 is a graph for explaining contents of a process for calculating an absolute amount of displacement by use of a scale control device of the linear absolute value scale.
Figure 22:
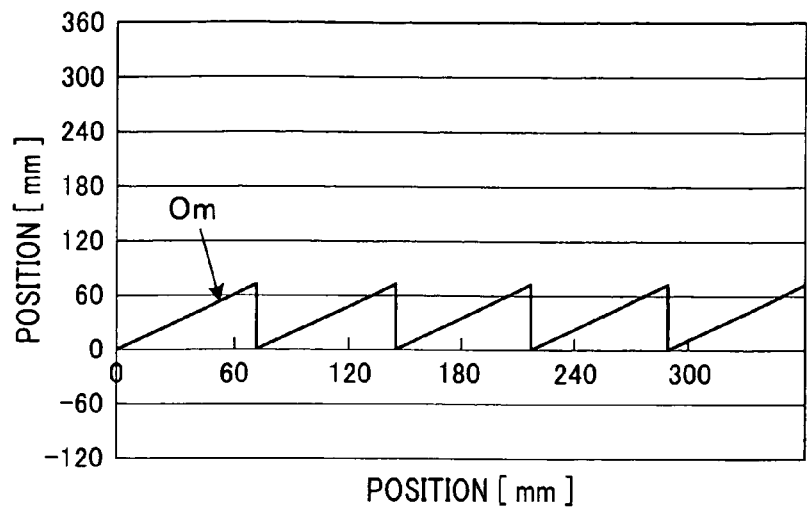
FIG. 22 is another graph for explaining the contents of the process for calculating the absolute amount of displacement by use of the scale control device of the linear absolute value scale.
Figure 23:
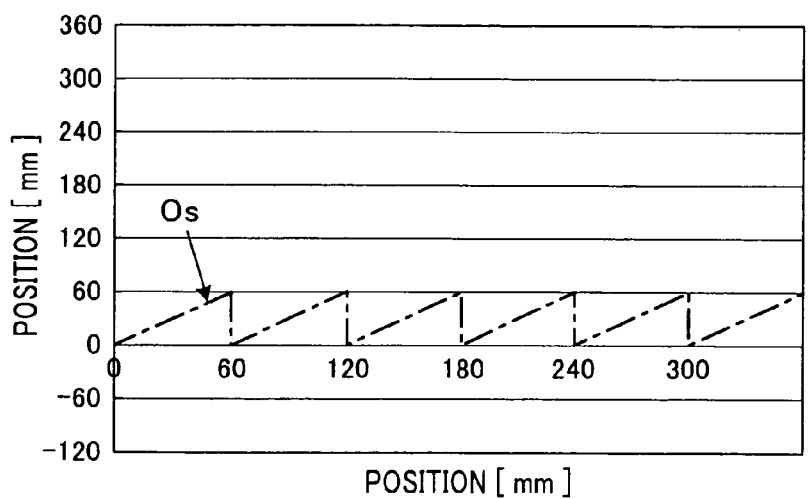
FIG. 23 is another graph for explaining the contents of the process for calculating the absolute amount of displacement by use of the scale control device of the linear absolute value scale.
Figure 24:
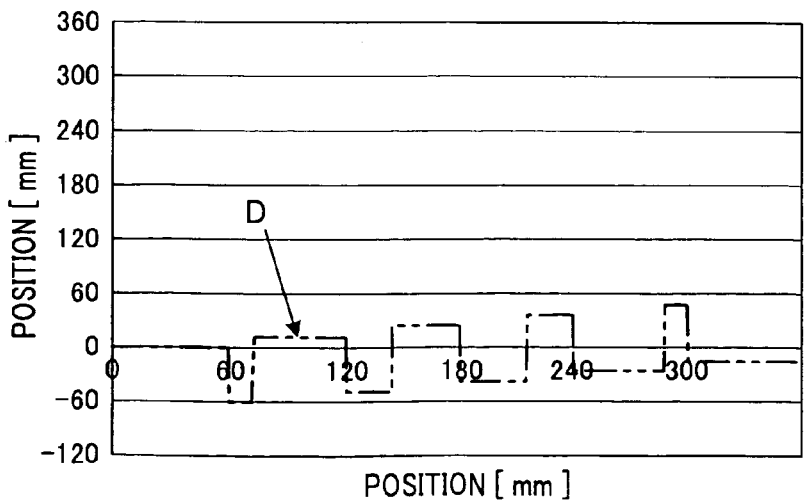
FIG. 24 is another graph for explaining the contents of the process for calculating the absolute amount of displacement by use of the scale control device of the linear absolute value scale.
Figure 25:
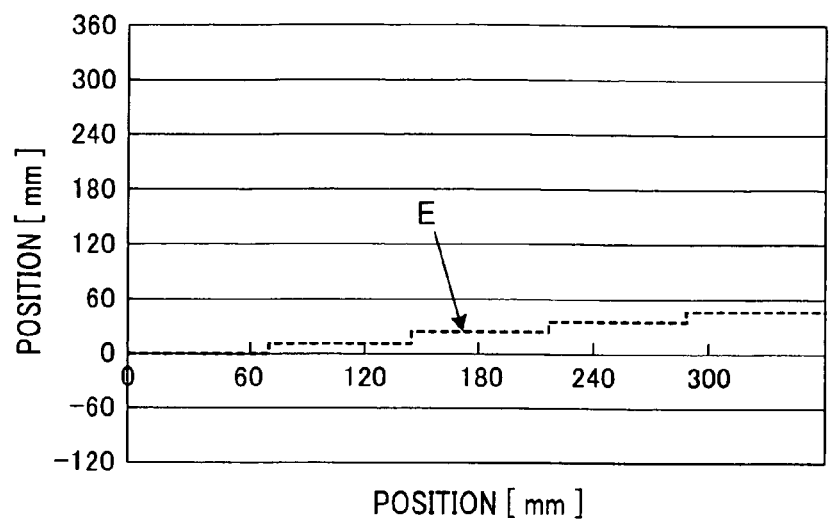
FIG. 25 is another graph for explaining the contents of the process for calculating the absolute amount of displacement by use of the scale control device of the linear absolute value scale.
Figure 26:
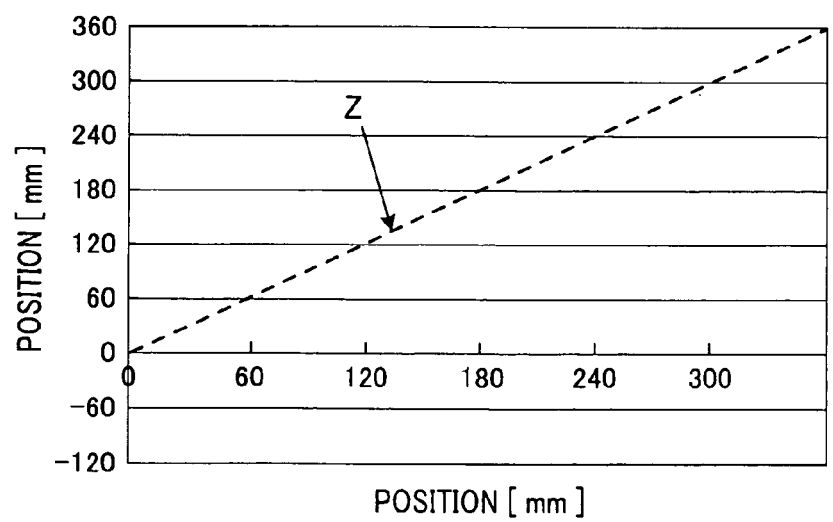
FIG. 26 is another graph for explaining the contents of the process for calculating the absolute amount of displacement by use of the scale control device of the linear absolute value scale.
Figure 27A:
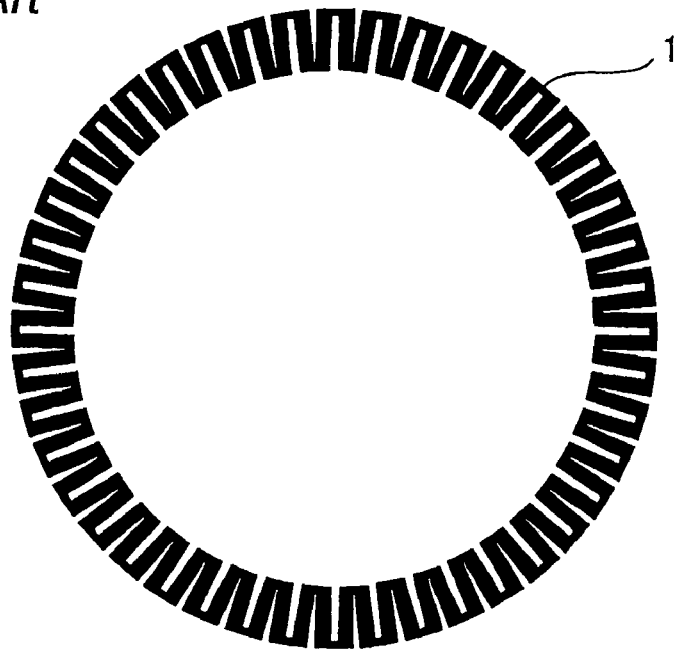
FIGS. 27A and 27B are front views of a rotor side coil pattern and a stator side coil pattern of a conventional rotary scale.
Figure 27B:
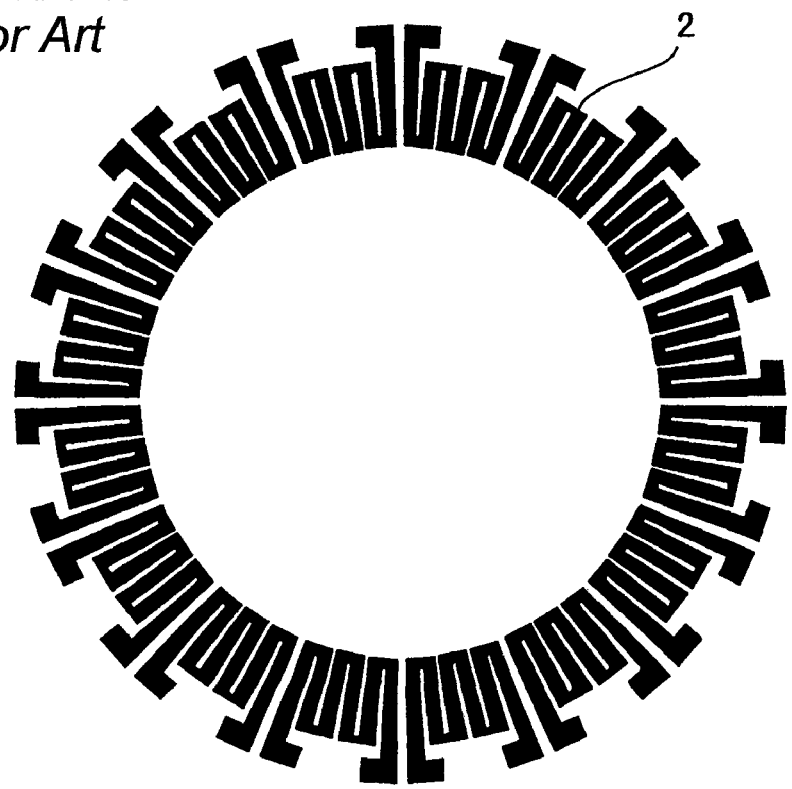
Figure 28:
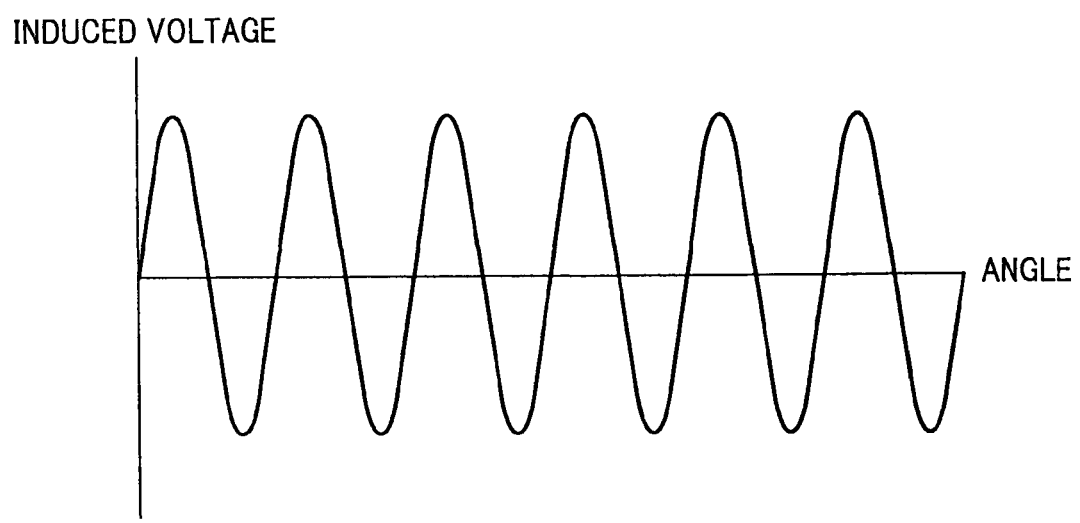
FIG. 28 is a diagram for explaining variation in an induced voltage.
Figure 29A:
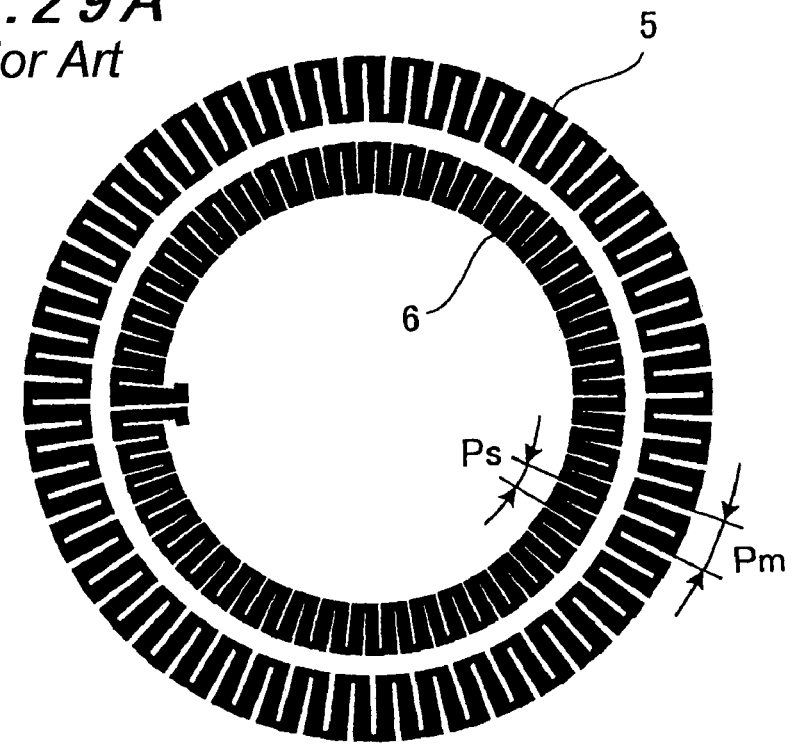
FIGS. 29A and 29B are front views of rotor side coil patterns and stator side coil patterns of a conventional rotary absolute value scale.
Figure 29B:
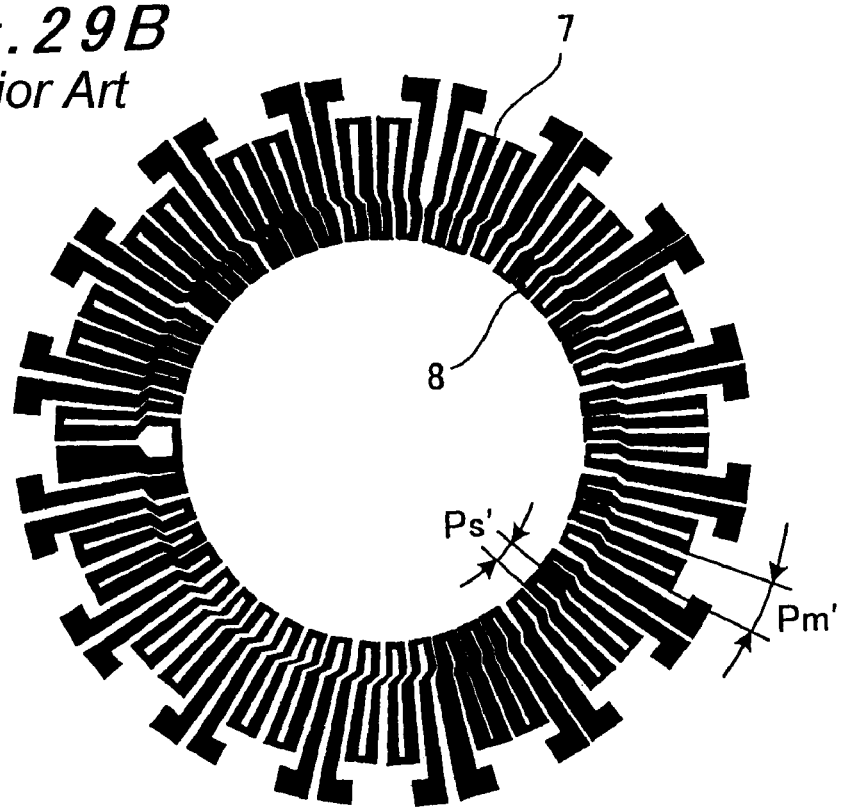
Figure 30A:
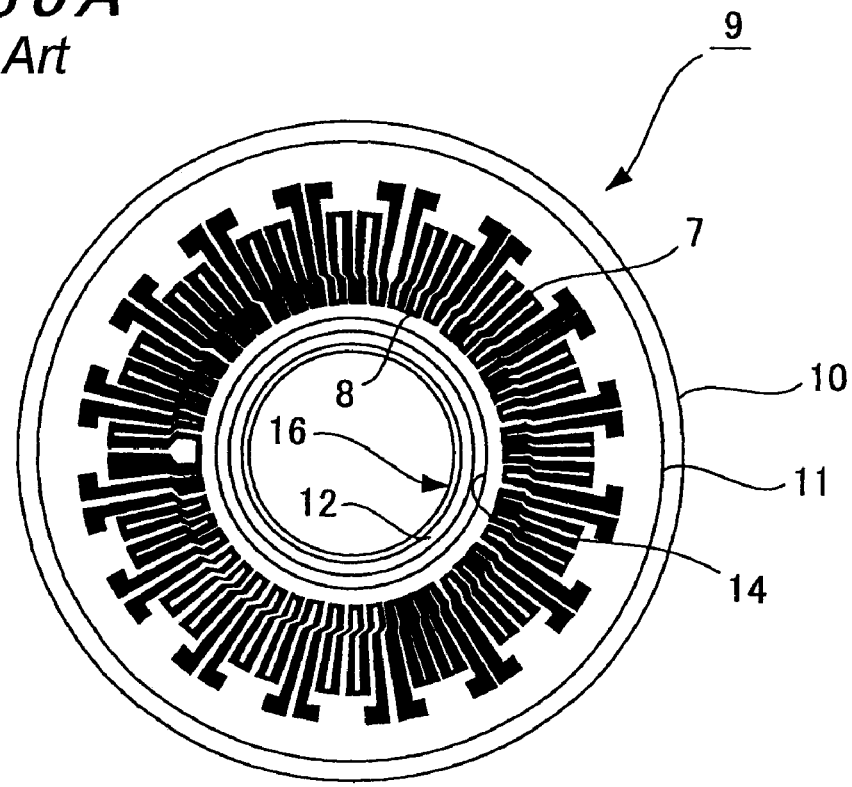
FIG. 30A is a front view of a stator constituting the conventional rotary absolute value scale and FIG. 30B is a sectional side view of the stator constituting the conventional rotary absolute value scale.
Figure 30B:
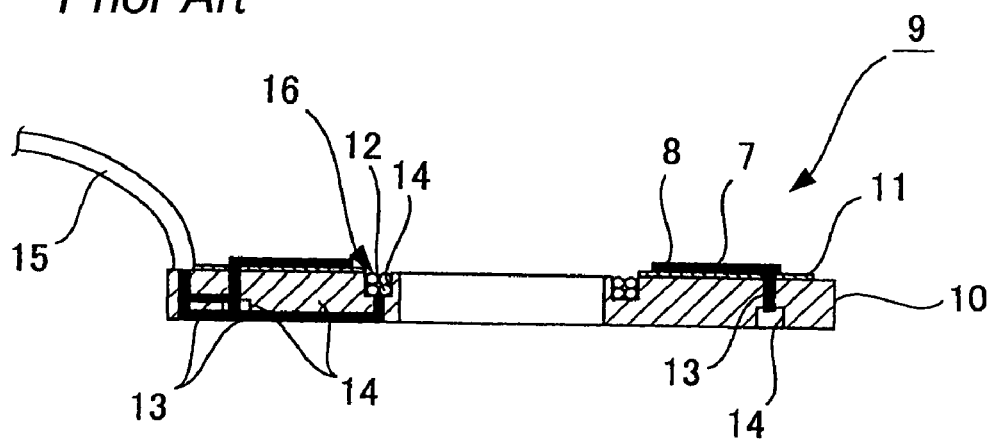
Figure 31A:
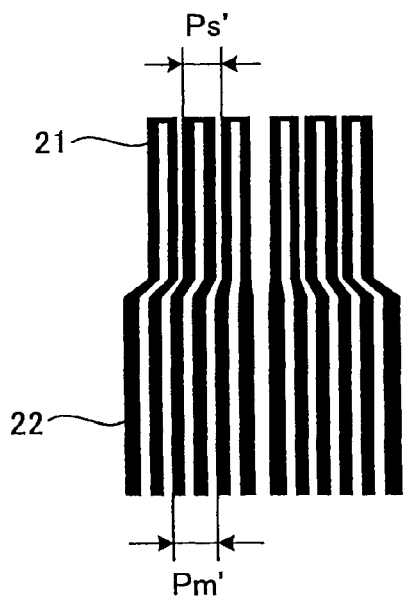
FIGS. 31A and 31B are front views of slider side coil patterns and scale side coil patterns of a conventional linear absolute value scale.
Figure 31B:
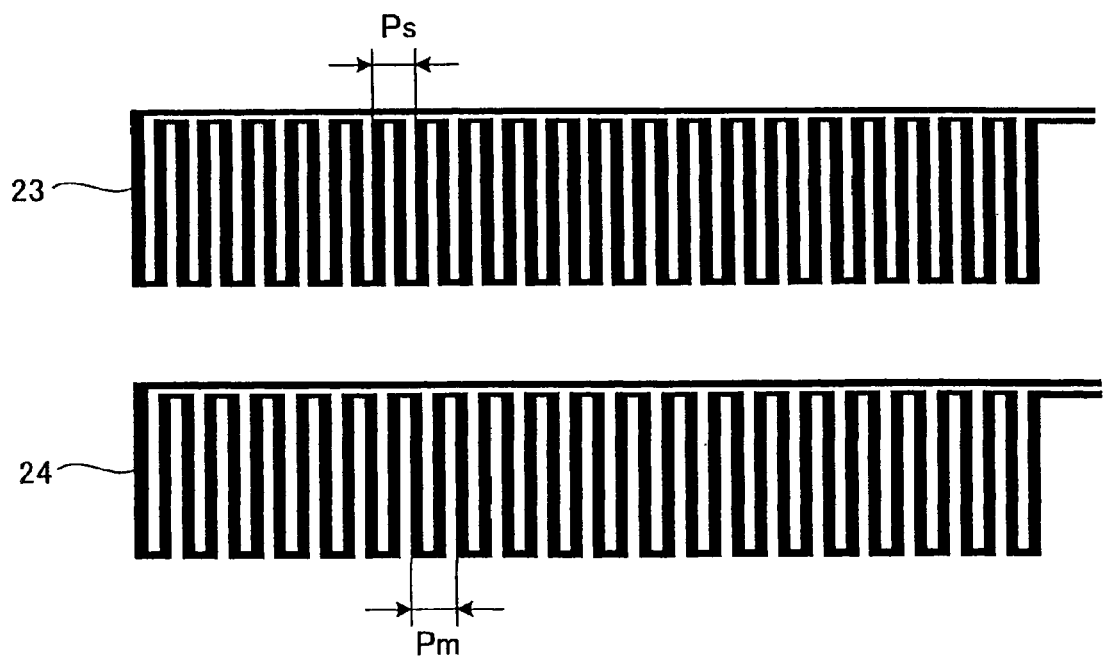
Figure 32A:
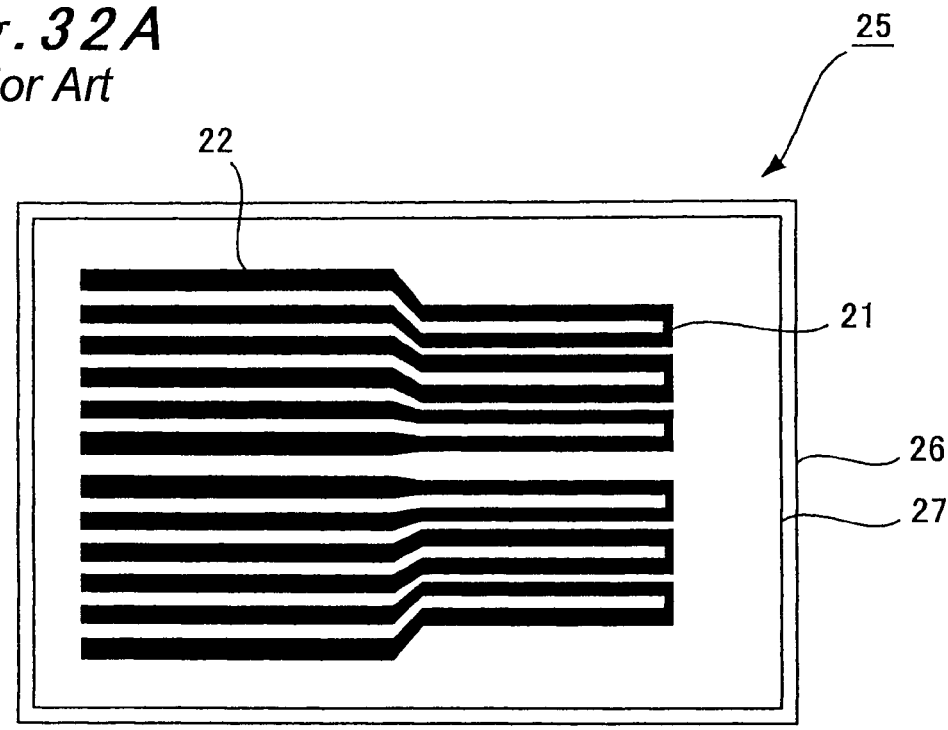
FIG. 32A is a front view of a slider constituting a conventional linear absolute value scale and FIG. 32B is a sectional side view of a scale constituting the conventional linear absolute value scale.
Figure 32B:
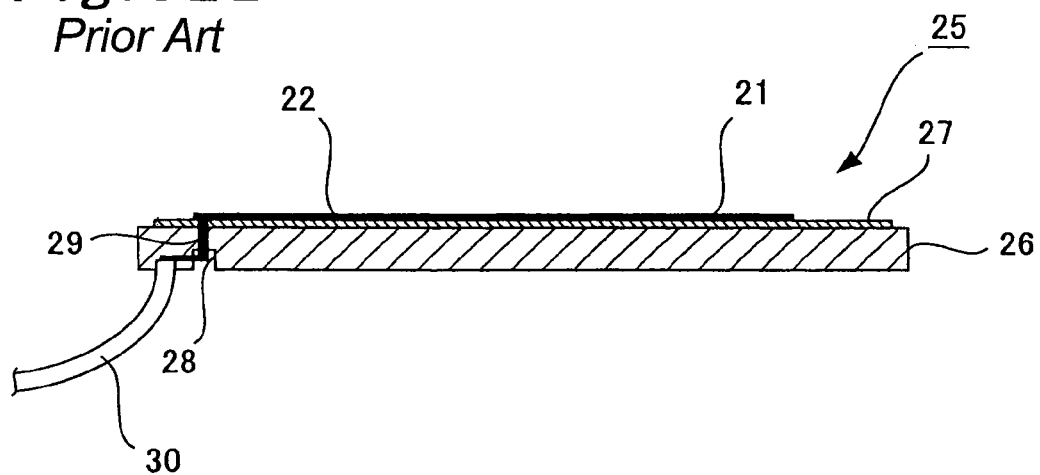

Here, as shown in FIGS. 21 to 23, positional relations between the slider side coil patterns 101 and 102 and the scale side coil patterns 103 and 104 are set such that both of the detected amounts of displacement Om and Os become equal to 0 [mm] when the position (the absolute amount of displacement) of the slider 111 is equal to 0 [mm]. However, there may be a case where the detected amounts of displacement Om and Os do not become equal to 0 [mm] as designed when the position (the absolute amount of displacement) of the slider 111 is equal to 0 [mm], and some deviation is generated in the detected amounts of displacement Om and Os. Such deviation may be attributable to positional deviation of the slider 111 relative to the scale 121 based on manufacturing variation of the linear absolute value scale, for example. Accordingly, deviation amounts (an offset amount) for these detected amount of displacements Om and Os are obtained in advance by an experiment and is inputted to the scale control device 131 or 141. Then, according to the deviation amounts (the offset amount), the scale control device 131 or 141 corrects the detected amount of displacements Om and Os derived from the induced voltages. Specifically, the scale control device 131 or 141 corrects (offsets) so as to adjust both of the detected amounts of displacement Om and Os to be equal to 0 [mm] when the amount of linear displacement (the absolute amount of displacement) of the slider 111 is equal to 0 [mm], by either adding or subtracting the deviation amounts (the offset amount) to or from the detected amounts of displacement Om and Os derived from the induced voltages.

Moreover, a relation between the pitch Pm and the pitch Ps needs to satisfy the following formulae (7) and (8). The formula (8) is a modified form of the formula (7). As mentioned previously, the value L in the formulae (7) and (8) is the detected amount of displacement of the entire linear absolute value scale, which is set to 360 [mm] in the illustrated example. Specifically, in the detected amount of displacement L of the entire linear absolute value scale (which is equal to 360 [mm] in the illustrated example), the number of pitches of the scale side coil pattern 103 having the pitch Ps is set one pitch larger than the number of pitches of the scale side coil pattern 104 having the pitch Pm. Naturally, the case of setting the pitch Pm equal to 72 [mm] and the pitch Ps equal to 60 [mm] satisfies the formulae (7) and (8). Accordingly, as can be seen in FIGS. 21 to 23, the number of iterated variation in the saw-tooth shape of the detected amount of displacement Os for a period of sliding motion of the slider 111 for 360 [mm] is one count greater than the number of iterated variation in the saw-tooth shape of the detected amount of displacement Om:

$$L/Pm - 1 = L/Ps \tag{7}$$

$$Ps = L/((L/Pm)+1) \tag{8}$$

Next, the scale control device 131 or 141 finds a difference D between the detected amount of displacement Os and the detected amount of displacement Om by calculating the following formula (9) on the basis of the detected amounts of displacement Om and Os:

$$D = Os - Om \tag{9}$$

Subsequently, the scale control device 131 or 141 judges whether the value D found by the formula (9) is positive or negative. If the value D is negative (D<0), the scale control device 131 or 141 finds a value E based on the following formula (10). That is, a value obtained by adding the pitch Ps to the value D is defined as the value E. On the contrary, if the value D is nonnegative (D≧0), the scale control device 131 or 141 finds the value E based on the following formula (11). Specifically, the value D found by the formula (9) is defined as the value E without change:

$$E = D + Ps \tag{10}$$

$$E = D \tag{11}$$

Then, the scale control device 131 or 141 finds an absolute amount of displacement Z of the slider 111 by calculating the following formula (12) on the basis of the value E set by use of the formula (10) or (11), the pitch Ps, and the detected amount of displacement Om. The value L in the formula (12) also represents the detected amount of displacement of the entire linear absolute value scale as described previously, which is set equal to 360 [mm] in the illustrated example:

$$Z = E \times L/Ps + Om \tag{12}$$

Cited below are examples of calculation of the absolute amount of displacement Z according to the illustrated example.

(1) When the position (the absolute amount of displacement) of the slider 111 is equal to 0 [mm], both of the detected amounts of displacement Om and Os become equal to 0 [mm], the value D becomes equal to 0, and the value E becomes equal to 0. Accordingly, the calculated value of the absolute amount of displacement Z also becomes equal to 0 [mm].

(2) When the position (the absolute amount of displacement) of the slider 111 is equal to 30 [mm], both of the detected amounts of displacement Om and Os become equal to 30 [mm], the value D becomes equal to 0, and the value E becomes equal to 0. Accordingly, the calculated value of the absolute amount of displacement Z also becomes equal to 30 [mm].

(3) When the position (the absolute amount of displacement) of the slider 111 is equal to 60 [mm], the detected amount of displacement Om becomes equal to 60 [mm], the detected amount of displacement Os becomes equal to 0 [mm], the value D becomes equal to −60, and the value E becomes equal to 0. Accordingly, the calculated value of the absolute amount of displacement Z also becomes equal to 60 [mm].

(4) When the position (the absolute amount of displacement) of the slider 111 is equal to 65 [mm], the detected amount of displacement Om becomes equal to 65 [mm], the detected amount of displacement Os becomes equal to 5 [mm], the value D becomes equal to −60, and the value E becomes equal to 0. Accordingly, the calculated value of the absolute amount of displacement Z also becomes equal to 65 [mm].

(5) When the position (the absolute amount of displacement) of the slider 111 is equal to 72 [mm], the detected amount of displacement Om becomes equal to 0 [mm], the detected amount of displacement Os becomes equal to 12 [mm], the value D becomes equal to 12, and the value E becomes equal to 12. Accordingly, the calculated value of the absolute amount of displacement Z also becomes equal to 72 [mm].

(6) When the position (the absolute amount of displacement) of the slider 111 is equal to 90 [mm], the detected amount of displacement Om becomes equal to 18 [mm], the detected amount of displacement Os becomes equal to 30 [mm], the value D becomes equal to 12, and the value E becomes equal to 12. Accordingly, the calculated value of the absolute amount of displacement Z also becomes equal to 90 [mm].

(7) When the position (the absolute amount of displacement) of the slider 111 is equal to 120 [mm], the detected amount of displacement Om becomes equal to 48 [mm], the detected amount of displacement Os becomes equal to 0 [mm], the value D becomes equal to −48, and the value E becomes equal to 12. Accordingly, the calculated value of the absolute amount of displacement Z also becomes equal to 120 [mm].

(8) When the position (the absolute amount of displacement) of the slider 111 is equal to 130 [mm], the detected amount of displacement Om becomes equal to 58 [mm], the detected amount of displacement Os becomes equal to 10 [mm], the value D becomes equal to −48, and the value E becomes equal to 12. Accordingly, the calculated value of the absolute amount of displacement Z also becomes equal to 130 [mm].

(9) When the position (the absolute amount of displacement) of the slider 111 is equal to 144 [mm], the detected amount of displacement Om becomes equal to 0 [mm], the detected amount of displacement Os becomes equal to 24 [mm], the value D becomes equal to 24, and the value E becomes equal to 24. Accordingly, the calculated value of the absolute amount of displacement Z also becomes equal to 144 [mm].

(10) When the position (the absolute amount of displacement) of the slider 111 is equal to 150 [mm], the detected amount of displacement Om becomes equal to 6 [mm], the detected amount of displacement Os becomes equal to 30 [mm], the value D becomes equal to 24, and the value E becomes equal to 24. Accordingly, the calculated value of the absolute amount of displacement Z also becomes equal to 150 [mm].

As described above, according to the linear absolute value scale of the second embodiment, the two slider side coil patterns 101 and 102 are laminated and the two scale side coil patterns 103 and 104 are also laminated. Accordingly, unlike the conventional case of providing two coil patterns in the same plane, it is possible to increase space occupied by each of the coil patterns 101, 102, 103 and 104 (lengths in a radial direction of the respective coil patterns 101, 102, 103 and 104) without increasing the size of the entire linear absolute value scale. As a consequence, it is possible to reduce an adverse effect attributable to manufacturing variation of the linear absolute value scale, and detection accuracy of the absolute amount of displacement of the slider 111 is thereby stabilized.

In addition, according to the linear absolute value scale of the second embodiment, the slider 111 is formed by providing the two slider side coil patterns 101 and 102 on the layers of the multilayer printed circuit board 113 in the form of printed wires. In the meantime, the scale 121 is formed by providing the two scale side coil patterns 103 and 104 on the layers of the multilayer printed circuit board 123 in the form of printed wires. As a consequence, it is possible to achieve patterning accuracy and positional accuracy of the coil patterns 101, 102, 103 and 104 easily, and to thereby realize the laminated structures of the coil patterns 101, 102, 103 and 104 easily. In addition, since the internal wires 114 and 124 can also be provided easily in the form of printed wires, the conventional cumbersome processes for providing wiring grooves on the base material are no longer required.

Additionally, according to the linear absolute value scale of the second embodiment, the linear absolute value scale includes the scale control device 131 (namely, the alternating current sources 132 and 133) for supplying the alternating currents to each of the slider side coil patterns 101 and 102 of the slider 111 at different timings. Accordingly, even with the structure formed by laminating the two slider side coil patterns 101 and 102 and laminating the two scale side coil patterns 103 and 104, it is possible to ensure detection accuracy of the absolute amount of displacement of the slider 111 while reducing electromagnetic interferences between these layers.

Moreover, according to the linear absolute value scale of the second embodiment, the linear absolute value scale includes: the scale control device 141 (namely, the alternating current sources 142 and 143) configured to supply the alternating currents having the different frequencies fm and fs to the slider side coil patterns 101 and 102 of the stator 111; and the filters 144 and 145 respectively provided on the output ends of the scale side coil patterns 103 and 104 of the scale 121, configured to cut off the voltage having the frequency different from the frequency fm or fs of the original induced voltage in each of the scale side coil patterns 103 and 104 of the scale 102. Accordingly, even with the structure formed by laminating the two slider side coil patterns 101 and 102 and laminating the two scale side coil patterns 103 and 104, it is possible to ensure detection accuracy of the absolute amount of displacement of the slider 111 while reducing electromagnetic interferences between these layers.

Furthermore, according to the linear absolute value scale of the second embodiment, the scale control device 141 (namely, the alternating current sources 142 and 143) supplies the alternating currents to each of the slider side coil patterns 101 and 102 of the slider 111 at different timings. Hence, it is possible to ensure detection accuracy of the absolute amount of displacement of the slider 111 more reliably while reducing electromagnetic interferences between these layers.

In addition, according to the linear absolute value scale of the second embodiment, the absolute amount of displacement of the slider 111 can be calculated easily and reliably since the relation between the pitch Pm of the scale side coil pattern 104 and the pitch Ps of the scale side coil pattern 103 is set to satisfy $Ps=L/((L/Pm)+1)$ where L is the detected amount of displacement of the entire linear absolute value scale, and the positional relation between the slider side coil patterns 101 and 102 and the scale side coil patterns 103 and 104 are set such that both of the detected amount of displacement Om found on the basis of the induced voltage of the scale side coil pattern 104 and the detected amount of displacement Os found on the basis of the induced voltage of the scale side coil pattern 103 become equal to 0 mm when the absolute amount of displacement of the slider 111 is equal to 0 mm. Moreover, the linear absolute value scale includes the scale control device 131 or 141 that calculates the absolute amount of displacement Z of the slider 111 in the following manner. Specifically, the detected amount of displacement Om is found on the basis of the induced voltage of the scale side coil pattern 104, the detected amount of displacement Os is found on the basis of the induced voltage of the scale side coil pattern 103, and the value D is found on the basis of the formula $D=Os-Om$. Subsequently, the value E is found on the basis of formula $E=D+Ps$ when the value D is a negative value, and the value E is found on the basis of the formula $E=D$ when the value D is a nonnegative value. Finally, the absolute amount of displacement Z of the slider 111 is found on the basis of the formula $Z=E \times L/Ps+Om$.

Additionally, according to the linear absolute value scale of the second embodiment, the scale control device 131 or 141 corrects both of the detected amounts of displacement Om and Os to become equal to 0 mm when the absolute amount of displacement of the slider 111 is equal to 0 mm, according to the deviation amounts of the detected amounts of displacement Om and Os from 0 mm obtained by a preliminary experiment when the absolute amount of displacement of the slider 111 is equal to 0 mm. Accordingly, even if the linear absolute value scale contains manufacturing variation, it is possible to ensure detection accuracy of the absolute amount of displacement of the slider 111.

Although the first and second embodiments have described the laminated structure and the circuit configuration in the case of laminating two coil patterns having different pitches, the present invention is not limited to this configuration. The above-described laminated structure and the circuit configuration are also applicable to a case where a rotary absolute value scale or a linear absolute value includes three or more coil patterns having different pitches.

Moreover, the method of calculating an absolute value as described in the first or second embodiment is not limited to the rotary absolute value scale or the linear absolute value scale which is formed by laminating two coil patterns having different pitches as described above. The method is also applicable to a rotary absolute value scale or a linear absolute value scale including two coil patterns having different pitches, which are provided in the same plane.

The present invention relates to an inductosyn type absolute value scale and a method of calculating an absolute value and is applicable to and suitable for cases of implementing an absolute value scale capable of suppressing an adverse effect attributable to manufacturing variation on detection accuracy of the absolute value scale and thereby obtaining stable detection accuracy, and of implementing an absolute value scale capable of easily and reliably calculating an absolute value.

What is claimed is:

1. An absolute value scale comprising:
   a slider including a plurality of slider side coil patterns each provided with a different pitch; and
   a scale including a plurality of scale side coil patterns each provided with a different pitch, wherein
   the slider and the scale are disposed to face each other so that the slider side coil patterns and the scale side coil patterns can face one another;
   the plurality of slider side coil patterns are laminated on each other; and
   the plurality of scale side coil patterns are laminated on each other.

2. The absolute value scale according to claim 1, further comprising
   feeding means for supplying alternating currents to the slider side coil patterns of the slider at respective different timings.

3. The absolute value scale according to claim 2, further comprising calculating means, wherein
   in the case where the absolute value scale is a rotary absolute value scale,
      the slider side coil patterns correspond to stator side coil patterns of the rotary absolute value scale,
      the slider corresponds to a stator of the rotary absolute value scale,
      the scale side coil patterns correspond to rotor side coil patterns of the rotary absolute value scale,
      the scale corresponds to a rotor of the rotary absolute value scale,
      the rotor includes a first rotor side coil pattern and a second rotor side coil pattern each provided with a different pitch,
      the stator includes a first stator side coil pattern and a second stator side coil pattern each provided with a different pitch,
      a relation between a pitch Pm of the first rotor side coil pattern and a pitch Ps of the second rotor side coil pattern is set to satisfy $Ps=360/((360/Pm)+1)$,
      a positional relation of the first and second rotor side coil patterns and the first and second stator side coil patterns is set such that both of a detected angle Om and a detected angle Os can be equal to 0° when an absolute angle of the rotor is equal to 0°, where the detected angle Om is found on the basis of an induced voltage of the first rotor side coil pattern and the detected angle Os is found on the basis of an induced voltage of the second rotor side coil pattern, and
      the calculating means finds an absolute angle Z of the rotor on the basis of a formula $Z=E\times 360/Ps+Om$ in such a way that: the detected angle Om is found on the basis of the induced voltage of the first rotor side coil pattern; the detected angle Os is found on the basis of the induced voltage of the second rotor side coil pattern; a value D is found on the basis of a formula $D=Os-Om$; a value E is found on the basis of a formula $E=D+Ps$ when the value D is a negative value; and the value E is found on the basis of a formula of $E=D$ when the value D is a nonnegative value, and
   in the case where the absolute value scale is a linear absolute value scale,
      the slider side coil patterns correspond to slider side coil patterns of the linear absolute value scale,
      the slider corresponds to a slider of the linear absolute value scale, the scale side coil patterns correspond to scale side coil patterns of the linear absolute value scale,
      the scale corresponds to a scale of the linear absolute value scale,
      the slider includes a first slider side coil pattern and a second slider side coil pattern each provided with a different pitch,
      the scale includes a first scale side coil pattern and a second scale side coil pattern each provided with a different pitch,
      a relation between a pitch Pm of the first scale side coil pattern and a pitch Ps of the second scale side coil pattern is set to satisfy $Ps=L/((L/Pm)+1)$ where L is a detected amount of displacement of the entire linear absolute value scale,
      a positional relation between the first and second slider side coil patterns and the first and second scale side coil patterns is set such that both of a detected amount of displacement Om and a detected amount of displacement Os can be equal to 0 mm when an absolute amount of displacement of the slider is equal to 0 mm, where the detected amount of displacement Om is found on the basis of an induced voltage of the first scale side coil pattern and the detected amount of displacement Os is found on the basis of an induced voltage of the second scale side coil pattern; and
      the calculating means finds an absolute amount of displacement Z of the slider on the basis of a formula $Z=E\times L/Ps+Om$ in such a way that: the detected amount of displacement Om is found on the basis of the induced voltage of the first scale side coil pattern; the detected amount of displacement Os is found on the basis of the induced voltage of the second scale side coil pattern; a value D is found on the basis of a formula $D=Os-Om$; a value E is found on the basis of a formula $E=D+Ps$ when the value D is a negative value; and the value E is found on the basis of a formula $E=D$ when the value D is a nonnegative value.

4. The absolute value scale according to claim 1, further comprising:
   feeding means for supplying alternating currents having different frequencies to the respective slider side coil patterns of the slider; and
   a filter provided on an output end of each of the scale side coil patterns of the scale and configured to cut off a voltage having a frequency different from a frequency of an original induced voltage in the each scale side coil pattern.

5. The absolute value scale according to claim 4
   wherein the feeding means supplies the alternating currents to the slider side coil patterns of the slider at respective different timings.

6. The absolute value scale according to claim 4, further comprising calculating means, wherein
   in the case where the absolute value scale is a rotary absolute value scale,
      the slider side coil patterns correspond to stator side coil patterns of the rotary absolute value scale, the slider corresponds to a stator of the rotary absolute value scale, the scale side coil patterns correspond to rotor side coil patterns of the rotary absolute value scale, the scale corresponds to a rotor of the rotary absolute value scale, the rotor includes a first rotor side coil pattern and a second rotor side coil pattern each provided with a different pitch, the stator includes a first stator side coil pattern and a second stator side coil pattern each provided with a different pitch, a relation between a pitch Pm of the first rotor side coil pattern and a pitch Ps of the second rotor side coil pattern is set to satisfy Ps=360/((360/Pm)+1), a positional relation of the first and second rotor side coil patterns and the first and second stator side coil patterns is set such that both of a detected angle Om and a detected angle Os can be equal to 0° when an absolute angle of the rotor is equal to 0°, where the detected angle Om is found on the basis of an induced voltage of the first rotor side coil pattern and the detected angle Os is found on the basis of an induced voltage of the second rotor side coil pattern, and the calculating means finds an absolute angle Z of the rotor on the basis of a formula Z=E×360/Ps+Om in such a way that: the detected angle Om is found on the basis of the induced voltage of the first rotor side coil pattern; the detected angle Os is found on the basis of the induced voltage of the second rotor side coil pattern; a value D is found on the basis of a formula D=Os−Om; a value E is found on the basis of a formula E=D+Ps when the value D is a negative value; and the value E is found on the basis of a formula of E=D when the value D is a nonnegative value, and in the case where the absolute value scale is a linear absolute value scale, the slider side coil patterns correspond to slider side coil patterns of the linear absolute value scale, the slider corresponds to a slider of the linear absolute value scale, the scale side coil patterns correspond to scale side coil patterns of the linear absolute value scale, the scale corresponds to a scale of the linear absolute value scale, the slider includes a first slider side coil pattern and a second slider side coil pattern each provided with a different pitch, the scale includes a first scale side coil pattern and a second scale side coil pattern each provided with a different pitch, a relation between a pitch Pm of the first scale side coil pattern and a pitch Ps of the second scale side coil pattern is set to satisfy Ps=L/((L/Pm)+1) where L is a detected amount of displacement of the entire linear absolute value scale, a positional relation between the first and second slider side coil patterns and the first and second scale side coil patterns is set such that both of a detected amount of displacement Om and a detected amount of displacement Os can be equal to 0 mm when an absolute amount of displacement of the slider is equal to 0 mm, where the detected amount of displacement Om is found on the basis of an induced voltage of the first scale side coil pattern and the detected amount of displacement Os is found on the basis of an induced voltage of the second scale side coil pattern; and the calculating means finds an absolute amount of displacement Z of the slider on the basis of a formula Z=E×L/Ps+Om in such a way that: the detected amount of displacement Om is found on the basis of the induced voltage of the first scale side coil pattern; the detected amount of displacement Os is found on the basis of the induced voltage of the second scale side coil pattern; a value D is found on the basis of a formula D=Os−Om; a value E is found on the basis of a formula E=D+Ps when the value D is a negative value; and the value E is found on the basis of a formula E=D when the value D is a nonnegative value.

7. The absolute value scale according to claim 4, further comprising calculating means, wherein in the case where the absolute value scale is a rotary absolute value scale, the slider side coil patterns correspond to stator side coil patterns of the rotary absolute value scale, the slider corresponds to a stator of the rotary absolute value scale, the scale side coil patterns correspond to rotor side coil patterns of the rotary absolute value scale, the scale corresponds to a rotor of the rotary absolute value scale, the rotor includes a first rotor side coil pattern and a second rotor side coil pattern each provided with a different pitch, the stator includes a first stator side coil pattern and a second stator side coil pattern each provided with a different pitch, a relation between a pitch Pm of the first rotor side coil pattern and a pitch Ps of the second rotor side coil pattern is set to satisfy Ps=360/((360/Pm)+1), a positional relation of the first and second rotor side coil patterns and the first and second stator side coil patterns is set such that both of a detected angle Om and a detected angle Os can be equal to 0° when an absolute angle of the rotor is equal to 0°, where the detected angle Om is found on the basis of an induced voltage of the first rotor side coil pattern and the detected angle Os is found on the basis of an induced voltage of the second rotor side coil pattern, and the calculating means finds an absolute angle Z of the rotor on the basis of a formula Z=E×360/Ps+Om in such a way that: the detected angle Om is found on the basis of the induced voltage of the first rotor side coil pattern; the detected angle Os is found on the basis of the induced voltage of the second rotor side coil pattern; a value D is found on the basis of a formula D=Os−Om; a value E is found on the basis of a formula E=D+Ps when the value D is a negative value; and the value E is found on the basis of a formula of E=D when the value D is a nonnegative value, and in the case where the absolute value scale is a linear absolute value scale, the slider side coil patterns correspond to slider side coil patterns of the linear absolute value scale, the slider corresponds to a slider of the linear absolute value scale, the scale side coil patterns correspond to scale side coil patterns of the linear absolute value scale, the scale corresponds to a scale of the linear absolute value scale, the slider includes a first slider side coil pattern and a second slider side coil pattern each provided with a different pitch, the scale includes a first scale side coil pattern and a second scale side coil pattern each provided with a different pitch, a relation between a pitch Pm of the first scale side coil pattern and a pitch Ps of the second scale side coil pattern is set to satisfy Ps=L/((L/Pm)+1) where L is a detected amount of displacement of the entire linear absolute value scale, a positional relation between the first and second slider side coil patterns and the first and second scale side coil patterns is set such that both of a detected amount of displacement Om and a detected amount of displacement Os can be equal to 0 mm when an absolute amount of displacement of the slider is equal to 0 mm, where the detected amount of displacement Om is found on the basis of an induced voltage of the first scale side coil pattern and the detected amount of displacement Os is found on the basis of an induced voltage of the second scale side coil pattern; and the calculating means finds an absolute amount of displacement Z of the slider on the basis of a formula Z=E×L/Ps+Om in such a way that: the detected amount of displacement Om is found on the basis of the induced voltage of the first scale side coil pattern; the detected amount of displacement Os is found on the basis of the induced voltage of the second scale side coil pattern; a value D is found on the basis of a formula D=Os−Om; a value E is found on the the slider corresponds to a slider of the linear absolute value scale, the scale side coil patterns correspond to scale side coil patterns of the linear absolute value scale, the scale corresponds to a scale of the linear absolute value scale, the slider includes a first slider side coil pattern and a second slider side coil pattern each provided with a different pitch, the scale includes a first scale side coil pattern and a second scale side coil pattern each provided with a different pitch, a relation between a pitch Pm of the first scale side coil pattern and a pitch Ps of the second scale side coil pattern is set to satisfy Ps=L/((L/Pm)+1) where L is a detected amount of displacement of the entire linear absolute value scale, a positional relation between the first and second slider side coil patterns and the first and second scale side coil patterns is set such that both of a detected amount of displacement Om and a detected amount of displacement Os can be equal to 0 mm when an absolute amount of displacement of the slider is equal to 0 mm, where the detected amount of displacement Om is found on the basis of an induced voltage of the first scale side coil pattern and the detected amount of displacement Os is found on the basis of an induced voltage of the second scale side coil pattern; and the calculating means finds an absolute amount of displacement Z of the slider on the basis of a formula Z=E×L/Ps+Om in such a way that: the detected amount of displacement Om is found on the basis of the induced voltage of the first scale side coil pattern; the detected amount of displacement Os is found on the basis of the induced voltage of the second scale side coil pattern; a value D is found on the basis of a formula D=Os−Om; a value E is found on the basis of a formula E=D+Ps when the value D is a negative value; and the value E is found on the basis of a formula E=D when the value D is a nonnegative value.

8. The absolute value scale according to claim 1, further comprising calculating means, wherein in the case where the absolute value scale is a rotary absolute value scale, the slider side coil patterns correspond to stator side coil patterns of the rotary absolute value scale, the slider corresponds to a stator of the rotary absolute value scale, the scale side coil patterns correspond to rotor side coil patterns of the rotary absolute value scale, the scale corresponds to a rotor of the rotary absolute value scale, the rotor includes a first rotor side coil pattern and a second rotor side coil pattern each provided with a different pitch, the stator includes a first stator side coil pattern and a second stator side coil pattern each provided with a different pitch, a relation between a pitch Pm of the first rotor side coil pattern and a pitch Ps of the second rotor side coil pattern is set to satisfy Ps=360/((360/Pm)+1), a positional relation of the first and second rotor side coil patterns and the first and second stator side coil patterns is set such that both of a detected angle Om and a detected angle Os can be equal to 0° when an absolute angle of the rotor is equal to 0°, where the detected angle Om is found on the basis of an induced voltage of the first rotor side coil pattern and the detected angle Os is found on the basis of an induced voltage of the second rotor side coil pattern, and the calculating means finds an absolute angle Z of the rotor on the basis of a formula Z=E×360/Ps+Om in such a way that: the detected angle Om is found on the basis of the induced voltage of the first rotor side coil pattern; the detected angle Os is found on the basis of the induced voltage of the second rotor side coil pattern; a value D is found on the basis of a formula D=Os−Om; a value E is found on the basis of a formula E=D+Ps when the value D is a negative value; and the value E is found on the basis of a formula of E=D when the value D is a nonnegative value, and in the case where the absolute value scale is a linear absolute value scale, the slider side coil patterns correspond to slider side coil patterns of the linear absolute value scale, the slider corresponds to a slider of the linear absolute value scale, the scale side coil patterns correspond to scale side coil patterns of the linear absolute value scale, the scale corresponds to a scale of the linear absolute value scale, the slider includes a first slider side coil pattern and a second slider side coil pattern each provided with a different pitch, the scale includes a first scale side coil pattern and a second scale side coil pattern each provided with a different pitch, a relation between a pitch Pm of the first scale side coil pattern and a pitch Ps of the second scale side coil pattern is set to satisfy Ps=L/((L/Pm)+1) where L is a detected amount of displacement of the entire linear absolute value scale, a positional relation between the first and second slider side coil patterns and the first and second scale side coil patterns is set such that both of a detected amount of displacement Om and a detected amount of displacement Os can be equal to 0 mm when an absolute amount of displacement of the slider is equal to 0 mm, where the detected amount of displacement Om is found on the basis of an induced voltage of the first scale side coil pattern and the detected amount of displacement Os is found on the basis of an induced voltage of the second scale side coil pattern; and the calculating means finds an absolute amount of displacement Z of the slider on the basis of a formula Z=E×L/Ps+Om in such a way that: the detected amount of displacement Om is found on the basis of the induced voltage of the first scale side coil pattern; the detected amount of displacement Os is found on the basis of the induced voltage of the second scale side coil pattern; a value D is found on the basis of a formula D=Os−Om; a value E is found on the basis of a formula E=D+Ps when the value D is a negative value; and the value E is found on the basis of a formula E=D when the value D is a nonnegative value.

9. The absolute value scale according to claim 8,
wherein, in the case where the absolute value scale is the rotary absolute value scale, the calculating means corrects both of the detected angles Om and Os to become equal to 0° when the absolute angle of the rotor is equal to 0°, according to deviation amounts of the detected angles Om and Os from 0°, the detected angles obtained by a preliminary experiment when the absolute angle of the rotor is equal to 0°, and in the case where the absolute value scale is the linear absolute value scale, the calculating means corrects both of the detected amounts of displacement Om and Os to become equal to 0 mm when the absolute amount of displacement of the slider is equal to 0 mm, according to deviation amounts of the detected amounts of displacement Om and Os from 0 mm, the detected amounts obtained by a preliminary experiment when the absolute amount of displacement of the slider is equal to 0 mm.

10. An absolute value scale comprising:
a slider having a first slider side coil pattern and a second slider coil pattern each provided with a different pitch; and
a scale having a first scale side pattern and a second scale side coil pattern each provided with a different pitch, the slider and the scale being disposed to face each other so that the first and second slider side coil patterns and the first and second scale side coil patterns can face one another; and
calculating means, wherein
in the case where the absolute value scale is a rotary absolute value scale,
the first slider side coil pattern and the second slider side coil pattern respectively correspond to a first stator side coil pattern and a second stator side coil pattern of the rotary absolute value scale,
the slider corresponds to a stator of the rotary absolute value scale,
the first scale side coil pattern and the second scale side coil pattern respectively correspond to a first rotor side coil pattern and a second rotor side coil pattern of the rotary absolute value scale, and
the scale corresponds to a rotor of the rotary absolute value scale,
a relation between the pitch Pm of the first rotor side coil pattern and the pitch Ps of the second rotor side coil pattern is set to satisfy Ps=360/((360/Pm)+1), a positional relation between the first and second rotor side coil patterns and the first and second stator side coil patterns is set such that both of a detected angle Om and a detected angle Os become equal to 0° when an absolute angle of the rotor is equal to 0°, where the detected angle Om is found on the basis of an induced voltage of the first rotor side coil pattern, and the detected angle Os is found on the basis of an induced voltage of the second rotor side coil pattern, and the calculating means finds an absolute angle Z of the rotor on the basis of a formula Z=E×360/Ps+Om in such a way that: the detected angle Om is found on the basis of the induced voltage of the first rotor side coil pattern; the detected angle Os is found on the basis of the induced voltage of the second rotor side coil pattern; a value D is found on the basis of a formula D=Os−Om; a value E is found on the basis of a formula E=D+Ps when the value D is a negative value; and the value E is found on the basis of a formula E=D when the value D is a nonnegative value, and in the case where the absolute value scale is a linear absolute value scale,
the first slider side coil pattern and the second slider side coil pattern respectively correspond to a first slider side coil pattern and a second scale side coil pattern of the linear absolute value scale,
the slider corresponds to a slider of the linear absolute value scale, the first scale side coil pattern and a second scale side coil pattern respectively correspond to a first scale side coil pattern and a second scale side coil pattern of the linear absolute value scale,
the scale corresponds to a scale of the linear absolute value scale,
a relation between the pitch Pm of the first scale side coil pattern and the pitch Ps of the second scale side coil pattern is set to satisfy Ps=L/((L/Pm)+1) where L is a detected amount of displacement of the entire linear absolute value scale,
a positional relation between the first and second slider side coil patterns and the first and second scale side coil patterns is set such that both of a detected amount of displacement Om and a detected amount of displacement Os become equal to 0 mm when an absolute amount of displacement of the slider is equal to 0 mm, where the detected amount of displacement Om is found on the basis of an induced voltage of the first scale side coil pattern and the detected amount of displacement Os is found on the basis of an induced voltage of the second scale side coil pattern, and the calculating means finds an absolute amount of displacement Z of the slider on the basis of a formula Z=E×L/Ps+Om in such a way that: the detected amount of displacement Om is found on the basis of the induced voltage of the first scale side coil pattern; the detected amount of displacement Os is found on the basis of the induced voltage of the second scale side coil pattern; a value D is found on the basis of a formula D=Os−Om; a value E is found on the basis of a formula E=D+Ps when the value D is a negative value; and the value E is found on the basis of a formula E=D when the value D is a nonnegative value.

11. The absolute value scale according to claim 1o,
wherein, in the case where the absolute value scale is the rotary absolute value scale, the calculating means corrects both of the detected angles Om and Os to become equal to 0° when the absolute angle of the rotor is equal to 0°, according to deviation amounts of the detected angles Om and Os from 0°, the detected angles obtained by a preliminary experiment when the absolute angle of the rotor is equal to 0°, and in the case where the absolute value scale is the linear absolute value scale, the calculating means corrects both of the detected amounts of displacement Om and Os to 0 mm when the absolute amount of displacement of the slider is equal to 0 mm, according to deviation amounts of the detected amounts of displacement Om and Os from 0 mm, the detected amounts obtained by a preliminary experiment when the absolute amount of displacement of the slider is equal to 0 mm.

12. A method of calculating an absolute value of an amount of displacement of a slider in an absolute value scale having the slider which includes a first slider side coil pattern and a second slider side coil pattern each provided with a different pitch and having a scale including a first scale side coil pattern and a second scale side coil pattern each provided with a different pitch, and in which the slider and the scale are disposed to face each other so that the first and second slider side coil patterns and the first and second scale side coil patterns can face one another, wherein:

in the case where the absolute value scale is a rotary absolute value scale, the first slider side coil pattern and the second slider side coil pattern respectively correspond to a first stator side coil pattern and a second stator side coil pattern of the rotary absolute value scale, the slider corresponds to a stator of the rotary absolute value scale, the first scale side coil pattern and the second scale side coil pattern respectively correspond to a first rotor side coil pattern and a second rotor side coil pattern of the rotary absolute value scale, the scale corresponds to a rotor of the rotary absolute value scale, and the absolute value of the amount of displacement of the slider corresponds to an absolute angle of the rotor of the rotary absolute value scale;

a relation between the pitch Pm of the first rotor side coil pattern and the pitch Ps of the second rotor side coil pattern is set to satisfy Ps=360/((360/Pm)+1); and a positional relation between the first and second rotor side coil patterns and the first and second stator side coil patterns is set such that both of a detected angle Om and a detected angle Os can be equal to 0° when the absolute angle of the rotor is equal to 0°, the detected angle Om found on the basis of an induced voltage of the first rotor side coil pattern and the detected angle Os found on the basis of an induced voltage of the second rotor side coil pattern; and the method comprises a step of finding an absolute angle Z of the rotor on the basis of a formula of Z=E×360/Ps+Om in such a way that: the detected angle Om is found on the basis of the induced voltage of the first rotor side coil pattern; the detected angle Os is found on the basis of the induced voltage of the second rotor side coil pattern; a value D is found on the basis of a formula D=Os−Om; a value E is found on the basis of a formula E=D+Ps when the value D is a negative value; the value E is found on the basis of a formula E=D when the value D is a nonnegative value, and the method wherein:

in the case where the absolute value scale is a linear absolute value scale, the first slider side coil pattern and the second slider side coil pattern respectively correspond to a first slider side coil pattern and a second slider side coil pattern of the linear absolute value scale, the slider corresponds to a slider of the linear absolute value scale, the first scale side coil pattern and a second scale side coil pattern respectively correspond to a first scale side coil pattern and a second scale side coil pattern of the linear absolute value scale, the scale corresponds to a scale of the linear absolute value scale, and the absolute value of the amount of displacement of the slider corresponds to an absolute amount of displacement of the slider of the linear absolute value scale;

a relation between the pitch Pm of the first scale side coil pattern and the pitch Ps of the second scale side coil pattern is set to satisfy Ps=L/((L/Pm)+1) where L is a detected amount of displacement of the entire linear absolute value scale; and a positional relation between the first and second slider side coil patterns and the first and second scale side coil patterns is set such that both of a detected amount of displacement Om and a detected amount of displacement Os can be equal to 0 mm when the absolute amount of displacement of the slider is equal to 0 mm, the detected amount of displacement Om found on the basis of an induced voltage of the first scale side coil pattern and the detected amount of displacement Os found on the basis of an induced voltage of the second scale side coil pattern, and the method comprises a step of finding an absolute amount of displacement Z of the slider on the basis of a formula Z=E×L/Ps+Om in such a way that: the detected amount of displacement Om is found on the basis of the induced voltage of the first scale side coil pattern; the detected amount of displacement Os is found on the basis of the induced voltage of the second scale side coil pattern; a value D is found on the basis of a formula D=Os−Om; a value E is found on the basis of a formula E=D+Ps when the value D is a negative value; the value E is found on the basis of a formula E=D when the value D is a nonnegative value.

13. The method of calculating an absolute value according to claim 12, wherein, in the case where the absolute value scale is the rotary absolute value scale, both of the detected angles Om and Os are corrected to become equal to 0° when the absolute angle of the rotor is equal to 0°, according to deviation amounts of the detected angles Om and Os from 0°, the detected angles obtained by a preliminary experiment when the absolute angle of the rotor is equal to 0°, and in the case where the absolute value scale is the linear absolute value scale, both of the detected amounts of displacement Om and Os are corrected to become equal to 0 mm when the absolute amount of displacement of the slider is equal to 0 mm, according to deviation amounts of the detected amounts of displacement Om and Os from 0 mm, the detected amounts obtained by a preliminary experiment when the absolute amount of displacement of the slider is equal to 0 mm.

* * * * *